United States Patent
Wang

(10) Patent No.: US 12,481,000 B2
(45) Date of Patent: Nov. 25, 2025

(54) CHARGING CONTROL METHOD FOR BATTERY PACK, CHARGING CONTROL APPARATUS FOR BATTERY PACK, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventor: Guangjun Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 475 days.

(21) Appl. No.: 18/063,358

(22) Filed: Dec. 8, 2022

(65) Prior Publication Data

US 2023/0133875 A1 May 4, 2023

Related U.S. Application Data

(63) Continuation of application No. PCT/CN2022/096956, filed on Jun. 2, 2022.

(30) Foreign Application Priority Data

Oct. 29, 2021 (CN) .......................... 202122624049.2

(51) Int. Cl.
*G01R 31/387* (2019.01)
*G01R 31/36* (2020.01)
(Continued)

(52) U.S. Cl.
CPC ....... *G01R 31/387* (2019.01); *G01R 31/3648* (2013.01); *H01M 10/44* (2013.01);
(Continued)

(58) Field of Classification Search
CPC ................ G01R 31/387; H02J 7/00302; H02J 7/00047–007194
See application file for complete search history.

(56) References Cited

U.S. PATENT DOCUMENTS

2002/0105305 A1* 8/2002 Yagi ...................... H02J 7/0048
320/148
2014/0145681 A1 5/2014 Vuorilehto et al.
(Continued)

FOREIGN PATENT DOCUMENTS

| CN | 101821920 A | 9/2010 |
|----|-------------|--------|
| CN | 103825336 A | 5/2014 |

(Continued)

OTHER PUBLICATIONS

CN112721732 translated abstract in English (Year: 2021).*
(Continued)

*Primary Examiner* — Andrew Schechter
*Assistant Examiner* — Brandon George Macgregor
(74) *Attorney, Agent, or Firm* — ANOVA LAW GROUP, PLLC

(57) ABSTRACT

A charging control method for a battery pack at least including two batteries connected in parallel. The method includes determining, based on a charging parameter, states of charge (SOCs) corresponding respectively to the batteries at elapsing of a preset charging time, calculating, according to the SOCs, an amount of charge transfer between the batteries after stopping charging at the elapsing of the preset charging time, judging whether a charge-receiving battery is in a critical overcharge state according to the amount of charge transfer, and, in response to the charge-receiving battery being in the critical overcharge state, stopping charging the battery pack at the elapsing of the preset charging time.

20 Claims, 7 Drawing Sheets

(51) Int. Cl.
*H01M 10/44* (2006.01)
*H02J 7/00* (2006.01)

(52) U.S. Cl.
CPC ........ *H02J 7/0013* (2013.01); *H02J 7/00302* (2020.01); *H02J 7/0048* (2020.01)

(56) References Cited

U.S. PATENT DOCUMENTS

| | | | |
|---|---|---|---|
| 2018/0313905 A1 | 11/2018 | Takahashi | |
| 2021/0159548 A1* | 5/2021 | Deng | ........................ H02P 7/00 |

FOREIGN PATENT DOCUMENTS

| | | | | |
|---|---|---|---|---|
| CN | 104426180 | A | | 3/2015 |
| CN | 108736524 | A | | 11/2018 |
| CN | 110783655 | A | | 2/2020 |
| CN | 111725864 | A | | 9/2020 |
| CN | 112721732 | A * | | 4/2021 ............. B60L 58/10 |
| JP | 2001045673 | A | | 2/2001 |
| JP | 2007259612 | A | | 10/2007 |
| JP | 2010045923 | A | | 2/2010 |
| JP | 2015012625 | A | | 1/2015 |
| JP | 2015115980 | A | | 6/2015 |
| JP | 2015195653 | A | | 11/2015 |
| JP | 6548387 | B2 | | 7/2019 |
| JP | 2020048318 | A | | 3/2020 |
| WO | 2010109872 | A1 | | 9/2010 |
| WO | 2012101771 | A1 | | 8/2012 |
| WO | 2012157747 | A1 | | 11/2012 |

OTHER PUBLICATIONS

CN112721732 translated description in English (Year: 2021).*
The Japan Patent Office (JPO) Decision to Grant a Patent for Application No. 2022-548812 Oct. 22, 2024 6 Pages (including translation).
The Korean Intellectual Property Office Submission of an Opinion for Application No. 10-2022-7028355 Sep. 13, 2024 10 Pages (including translation).
The World Intellectual Property Organization (WIPO) International Search Report for PCT/CN2022/096956 Aug. 22, 2022 6 Pages (With translation).
European Patent Office Extended European Search Report for EP 22746936.8 Jan. 27, 2023 9 pages.
The World Intellectual Property Organization (WIPO) Written Opinion for PCT/CN2022/096956 Aug. 22, 2022 5 Pages (including translation).
Japan Patent Office (JPO) Notice of Reasons for Refusal For JP Application No. 2022-548812 Jan. 9, 2024 7 Pages (Translation Included).
State Intellectual Property Office of China Notification to Grant Patent Right for Application No. 202210525044.0 Jun. 9, 2025 6 pages (including translation).

\* cited by examiner

CHARGING CONTROL METHOD FOR BATTERY PACK, CHARGING CONTROL APPARATUS FOR BATTERY PACK, ELECTRONIC DEVICE, AND STORAGE MEDIUM

CROSS-REFERENCE TO RELATED APPLICATIONS

The present application is a continuation of International Application No. PCT/CN2022/096956, filed on Jun. 2, 2022, which claims priority to Chinese patent application 202122624049.2 entitled "CHARGING CONTROL METHOD FOR BATTERY PACK, CHARGING CONTROL APPARATUS FOR BATTERY PACK, ELECTRONIC DEVICE, AND STORAGE MEDIUM" and filed on Oct. 29, 2021, the entire contents of both of which are incorporated herein by reference.

TECHNICAL FIELD

The present application relates to the technical field of batteries and, in particular, to a charging control method for a battery pack, a charging control apparatus for a battery pack, an electronic device, and a storage medium.

BACKGROUND ART

Energy saving and emission reduction of vehicles is the key to the sustainable development of the automobile industry. Electric vehicles have become an important part of the sustainable development of the automobile industry because of their advantages of energy saving and environmental protection. For electric vehicles, battery technology is an important factor in their development.

After the charging of the battery pack is completed, there is a problem of overcharging of battery cells in each battery branch, which shortens the service life of the battery pack and brings potential safety hazards.

SUMMARY

In view of the above problem, the present application provides a charging control method for a battery pack, a charging control apparatus for a battery pack, an electronic device, and a storage medium, which can avoid the problem of overcharging of battery cells in a battery pack having multiple batteries connected in parallel.

In a first aspect, the present application provides a charging control method for a battery pack, wherein the battery pack at least comprises two groups of batteries connected in parallel. The method comprises: determining states of charge (SOCs) corresponding respectively to the batteries after a preset charging time based on a charging parameter; calculating an amount of transferred charge between the batteries after stopping charging after the preset charging time according to the SOCs; judging whether a charge-receiving battery is in a critical overcharge state according to the amount of transferred charge; and if yes, stopping charging the battery pack after the preset charging time.

In the technical solution of the embodiments of the present application, the amount of transferred charge between the batteries after stopping charging after the preset charging time is calculated according to the SOCs corresponding respectively to the batteries in the battery pack after the preset charging time, thereby judging whether the charge-receiving battery is in the critical overcharge state based on the amount of transferred charge, and if yes, the charging of the battery pack is stopped after the preset charging time. In this way, after the charging of the battery pack is completed, even if there exists mutual charging between batteries in the battery pack, battery cells in the batteries will not be overcharged the receiving of charge, thus extending the service life of the battery pack and reducing the probability of safety hazards of the battery pack.

In some embodiments, the SOC is a collection of cell SOCs corresponding respectively to battery cells in the batteries; and said calculating an amount of transferred charge between the batteries after stopping charging after the preset charging time according to the SOCs comprises: determining average SOCs corresponding respectively to any two groups of batteries according to the SOCs, the any two groups of batteries being two groups of batteries having a relationship of charge transfer; determining an average charge difference between the any two groups of batteries according to the average SOCs; and calculating, based on a conversion relationship between open-circuit voltages and SOCs, the average charge difference, and an average SOC of a charge-receiving battery in the any two groups of batteries, an amount of transferred charge between the any two groups of batteries after stopping charging after the preset charging time.

The average charge difference between the two groups of batteries is calculated through the average SOCs corresponding respectively to the two groups of batteries, and since there are often a plurality of battery cells in a battery while the SOCs of the battery cells may be different, by using the average SOC, the SOC level of each battery cell in the batteries can be more realistically represented, and thus the amount of transferred charge between the two groups of batteries can be more accurately determined.

In some embodiments, said calculating, based on a conversion relationship between open-circuit voltages and SOCs, the average charge difference, and an average SOC of a charge-receiving battery in the any two groups of batteries, an amount of transferred charge between the any two groups of batteries after stopping charging after the preset charging time comprises: calculating the amount of transferred charge between the any two groups of batteries after stopping charging after the preset charging time according to OCV$(SOC_{avg} + k \cdot SOC_{trans}) = OCV(SOC_{avg} + \Delta SOC - SOC_{trans})$, wherein OCV( ) denotes the conversion relationship between open-circuit voltages and SOCs, $SOC_{avg}$ denotes the average SOC of the charge-receiving battery, $\Delta SOC$ denotes the average charge difference between the any two groups of batteries, k denotes a battery aging factor, and $SOC_{trans}$ denotes the amount of transferred charge between the any two groups of batteries.

In the process of calculating the amount of transferred charge between the two batteries based on the conversion relationship between open-circuit voltages and SOCs, the average charge difference between the two batteries, and the average SOC of the charge-receiving battery in the two batteries, the aging condition of the charge-receiving battery is fully considered, that is, the amount of charge that the charge-receiving battery can actually receive; moreover, by including the battery aging factor in the calculation of the amount of transferred charge, it is possible to more accurately determine the amount of transferred charge between the two batteries, and thus more accurately determine whether the charge-receiving battery will reach the critical overcharge state after the charging is stopped at a preset time, and thus more accurately control the charging of the battery pack.

In some embodiments, before said calculating the amount of transferred charge between the any two groups of batteries after stopping charging after the preset charging time according to OCV(SOC$_{avg}$+k·SOC$_{trans}$)=OCV(SOC$_{avg}$+ΔSOC−SOC$_{trans}$), the method further comprises: acquiring a theoretical open-circuit voltage and an actual open-circuit voltage of the charge-receiving battery after a previous mutual charging of the any two groups of batteries; judging whether the theoretical open-circuit voltage is equal to the actual open-circuit voltage; if yes, using a battery aging factor used during a previous charging process as the battery aging factor; and if not, determining the battery aging factor according to $$OCV(SOC_{avg} + k \cdot SOC_{trans-calculated}) =$$
$$OCV(SOC_{avg} + \Delta SOC - SOC_{trans-actual}) \text{ or}$$
$$k = \frac{SOC_{trans-actual}}{SOC_{trans-calculated}},$$

wherein OCV( ) denotes the conversion relationship between open-circuit voltages and SOCs, SOC$_{avg}$ denotes the average SOC of the charge-receiving battery, ΔSOC denotes the average charge difference between the any two groups of batteries, k denotes a battery aging factor, SOC$_{trans-calculated}$ denotes a previous theoretical amount of transferred charge between the any two groups of batteries, and SOC$_{trans-actual}$ denotes a previous actual amount of transferred charge between the any two groups of batteries.

During each charging control of the battery pack, the battery aging parameter needs to be corrected, so that it is possible to accurately estimate during each charging control the actual amount of charge gained by the charge-receiving battery, and thus to more accurately determine whether the charge-receiving battery will reach a critical overcharge state after the charging is stopped at a preset time, thereby more accurately controlling the charging of the battery pack.

In some embodiments, said determining average SOCs corresponding respectively to any two groups of batteries according to the SOCs comprises: acquiring total open-circuit voltages and total numbers of battery cells corresponding respectively to the any two groups of batteries; determining average open-circuit voltages corresponding respectively to the any two groups of batteries based on the total open-circuit voltages and the total numbers; and determining an average SOC of the any two groups of batteries based on the average open-circuit voltages and the conversion relationship between open-circuit voltages and SOCs.

The open-circuit voltage of each battery cell is acquired, and the open-circuit voltages of the battery cells are added up to obtain the total open-circuit voltage of the battery. Since there is a certain error in the acquisition of the open-circuit voltage of each battery cell, there will be a large error in the total open-circuit voltage of the battery obtained by adding the open-circuit voltages of the battery cells. By directly obtaining the total open-circuit voltage of the batteries and determining the average open-circuit voltage of the battery based on the total open-circuit voltage of the batteries so as to determine the average SOC of the battery, the error in the acquisition of the total open-circuit voltage of the batteries can be reduced, and thus the accuracy of determining the average SOC of the battery can be improved, and thus the amount of transferred charge can be determined more accurately, thus improving the accuracy of charging control of the battery pack to more accurately avoid overcharging of the battery.

In some embodiments, said judging whether a charge-receiving battery is in a critical overcharge state according to the amount of transferred charge comprises: determining, in the charge-receiving battery, a target battery cell having the highest SOC before charge transfer; and judging whether the charge-receiving battery is in the critical overcharge state based on the amount of transferred charge, an SOC of the target battery cell, the conversion relationship between open-circuit voltages and SOCs, and a warning voltage value.

By determining whether the charge-receiving battery will be overcharged after charging is stopped after the preset charging time based on whether the target battery cell with the highest SOC in the charge-receiving battery before the charge transfer will be overcharged after charging is stopped after the preset charging time, it is possible to reduce the amount of calculation of the SOC of the battery and thus improve the speed of determining whether the battery is in the critical overcharge state, thereby improving the real-time performance of charging control of the battery pack.

In some embodiments, said judging whether the charge-receiving battery is in the critical overcharge state based on the amount of transferred charge, an SOC of the target battery cell, the conversion relationship between open-circuit voltages and SOCs, and a warning voltage value comprises: determining, if OCV(SOC$_{avg}$+ΔSOC$_{abn}$−k·SOC$_{trans}$)≤V$_{warning}$ is satisfied, that the charge-receiving battery is not in the critical overcharge state; and determining, if OCV(SOC$_{avg}$+ΔSOC$_{abn}$−k·SOC$_{trans}$)≤V$_{warning}$ is not satisfied, that the charge-receiving battery is in the critical overcharge state, wherein OCV( ) denotes the conversion relationship between open-circuit voltages and SOCs, SOC$_{avg}$ denotes the average SOC of the charge-receiving battery, ΔSOC$_{abn}$ denotes a difference between the SOC of the target battery cell and SOC$_{avg}$, k denotes the battery aging factor, SOC$_{trans}$ denotes the amount of transferred charge between the any two groups of batteries, the any two groups of batteries being two groups of batteries having a relationship of charge transfer, and V$_{warning}$ denotes the warning voltage value.

When determining the open-circuit voltage of the target battery cell after charge transfer that has the highest SOC in the charge-receiving battery before charge transfer, the battery aging parameter is still considered during the transfer of charge to the target battery cell, that is, the actual amount of charge received by the target battery cell is taken into account, which makes it possible to improve the accuracy of determining the open-circuit voltage of the target battery cell after mutual charging and thus more accurately determine whether the charge-receiving battery is in the critical overcharge state, thereby improving the accuracy of charging control of the battery pack.

In some embodiments, after said judging whether a charge-receiving battery is in a critical overcharge state according to the amount of transferred charge, the method further comprises: if not, determining a state difference between a current SOC of the charge-receiving battery and the critical overcharge state; and charging, when the state difference is greater than or equal to a preset difference, the battery pack at a first charging rate after the preset charging time; and charging, when the state difference is less than the preset difference, the battery pack at a second charging rate after the preset charging time, the second charging rate being less than the first charging rate.

The subsequent charging rate for the battery pack is determined according to the magnitude of the state difference between the current SOC of the charge-receiving battery and the critical overcharge state. When the state difference is large, the battery pack may be continued to be charged at a high charging rate, which can shorten the charging time of the battery pack and improve the charging efficiency of the battery pack. When the state difference is small, the battery pack may be continued to be charged at a low charging rate, which can avoid the battery from quickly passing the critical overcharge state, and can accurately control to stop charging when the battery is about to reach the critical overcharge state, thus improving the accuracy of charging control.

In a second aspect, the present application provides a charging control apparatus for a battery pack, wherein the battery pack at least comprises two groups of batteries connected in parallel. The apparatus comprises: a determination module for determining states of charge (SOCs) corresponding respectively to the batteries after a preset charging time based on a charging parameter; a calculation module for calculating an amount of transferred charge between the batteries after stopping charging after the preset charging time according to the SOCs; a judgement module for judging whether a charge-receiving battery is in a critical overcharge state according to the amount of transferred charge; and a control module for: if yes, stopping charging the battery pack after the preset charging time.

In a third aspect, the present application provides an electronic device, comprising: a processor, a memory, and a bus, wherein the processor and the memory complete communication with each other via the bus; and the processor is used for invoking program instructions in the memory to perform the method in the first aspect.

In a fourth aspect, the present application provides a computer-readable storage medium, characterized by comprising a stored program, wherein the program, when executed, controls a device in which the storage medium is located to execute the method in the first aspect.

The above description is only an overview of the technical solutions of the present application, which can be implemented according to the contents of the specification in order for more clear understanding of the technical means of the present application; and in order to make the above and other objectives, features and advantages of the present application more obvious and understandable, specific implementations of the present application are exemplified below.

DESCRIPTION OF DRAWINGS

By reading the detailed description of some implementations below, various other advantages and benefits will become apparent to those of ordinary skill in the art. The accompanying drawings are for the purpose of illustrating some implementations only and are not to be considered a limitation of the present application. Moreover, in all of the accompanying drawings, the same parts are indicated by the same reference numerals. In the accompanying drawings.

DETAILED DESCRIPTION

Figure 1:
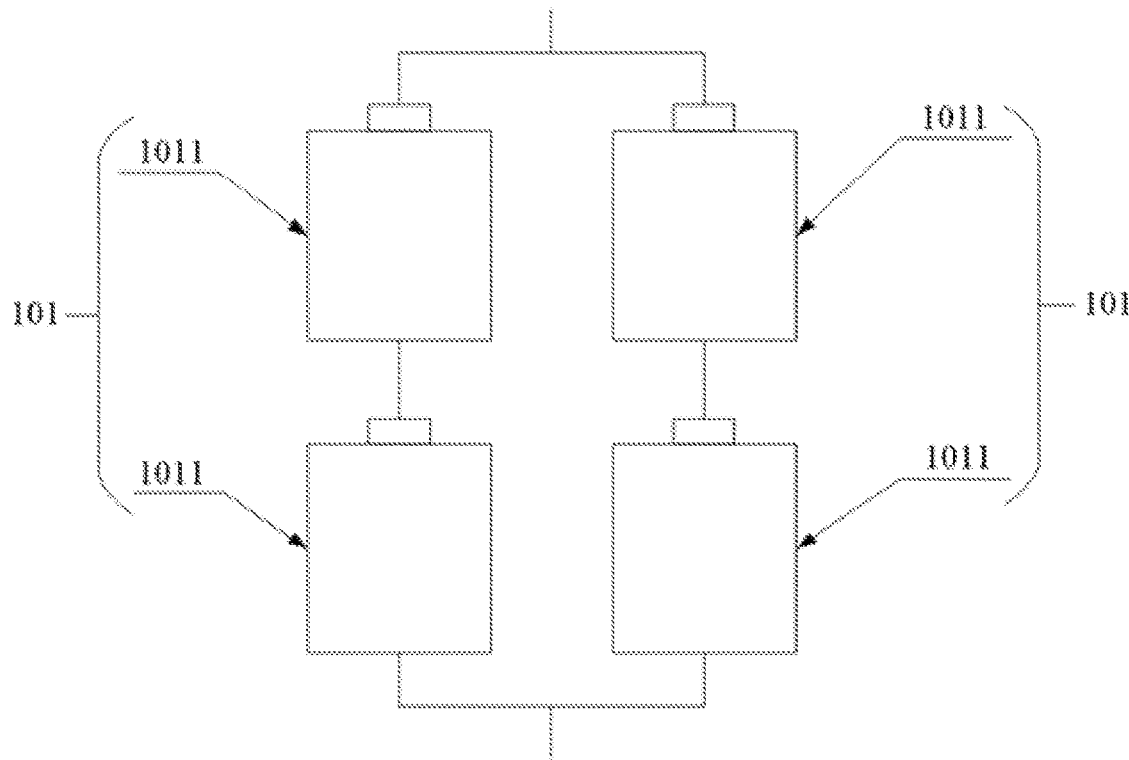
FIG. 1 is a schematic structural diagram of a battery pack in an embodiment of the present application.

Hereinafter, embodiments of the technical solution of the present application will be described in detail with reference to the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", etc., are used only to distinguish between different objects and are not to be understood as indicating or implying relative importance or implicitly specifying the number, particular order or priority of the indicated technical features. In the description of the embodiments of the present application, "multiple" means two or more than two, unless otherwise expressly and specifically limited.

References herein to "embodiment" mean that the particular features or characteristics described in conjunction with the embodiment may be contained in at least one embodiment of the present application. The presence of this word in various places in the specification does not necessarily mean the same embodiment, nor is it a separate or an alternative embodiment that is mutually exclusive with other embodiments. It is understood, both explicitly and implicitly, by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally indicates that the associated objects before and after the character have an "or" relationship.

In the description of the embodiments of the present application, the term "multiple" refers to two or more than two; similarly, "multiple groups" refers to two or more than two groups, and "multiple pieces" refers to two or more than two pieces.

In the description of the embodiments of the present application, the orientation or location relationships indicated by the technical terms "center", "longitudinal", "transverse", "length", "width", "thickness", "up", "down", "front", "back", "left", "right", "vertical", "horizontal", "top", "bottom", "inside", "outside", "clockwise", "counter-clockwise", "axial", "radial", "circumferential" and the like are based on the orientation or location relationships shown in the accompanying drawings, and are only for convenience and simplification of the description of the embodiments of the present application, but do not indicate or imply that the apparatuses or elements referred to must have particular orientations, be constructed and operated in particular orientations, and therefore cannot be construed as a limitation of the embodiments of the present application.

In the description of the embodiments of the present application, unless otherwise expressly specified and limited, the technical terms "mounting," "connected," "connecting," "fixing", and the like shall be understood in a broad sense, which, for example, may be a fixed connection, or a detachable connection or an integral connection; may also be a mechanical connection, or an electrical connection; may be a direct connection, or an indirect connection through an intermediate medium, and may be a communication within two elements or an interactive relationship between two elements. For those of ordinary skill in the art, the specific meanings of the above terms in the embodiments of the present application may be understood according to specific circumstances.

Currently, as the electric vehicle industry continues to develop, battery charging technology is gradually receiving more and more attention. For an electric vehicle with high power consumption, such as an electric bus vehicle, due to its high power consumption characteristics, for the continuous and stable power supply, multiple batteries need to be connected in parallel to form a battery pack so as to power the vehicle.

The present inventors note that after the battery pack has been charged and discharged for a number of cycles, when the battery pack is charged again, there will be mutual charging between the various battery branches in the battery pack after the charging is completed, that is, one battery branch charges another battery branch. This is because there is an impedance mismatch between the battery branches in the battery pack, especially after the aging of battery cells in the battery branches, the impedance mismatch between the battery branches is more significant. At the end of the charging of the battery pack, there will be a situation where the overall state of charge (SOC) of one battery branch is higher than the overall SOC of another battery branch. In this case, the battery branch with the higher SOC charges the battery branch with the lower SOC, that is, mutual charging is conducted until a balance is achieved between the overall SOCs of the two battery branches. However, if the SOC of a certain battery cell in the battery branch being charged is high before mutual charging, it is possible that the SOC of that battery cell will exceed 100% after mutual charging, that is, overcharging will occur. This leads to the shortening of the service life of the battery pack, and in serious cases, it brings about explosions, fires and other safety hazards.

In order to avoid the problem of overcharging of battery cells in battery branches, the inventors found through their research that it is possible to calculate in sequence the amount of transferred charge between the battery branches after charging of the battery pack is stopped at various moments in the charging process, and then determine in sequence, based on the result of each calculation, whether the SOCs of the battery cells in the charged battery branches reach their maximum SOCs after charging of the battery pack is stopped at various moments and mutual charging between the battery branches in the battery pack is completed. If the maximum SOCs are not reached, it means that even if, at this moment, charging of the battery pack is stopped and mutual charging occurs between the battery branches, overcharging of the battery cells will not be caused, and thus charging of the battery pack can be continued at this moment. If the maximum SOCs are reached, it means that if, at this moment, charging of the battery pack is stopped and mutual charging occurs between the battery branches, the battery cells will be caused to reach their maximum SOCs, and thus charging of the battery pack needs to be stopped at this moment. If charging of the battery pack is continued at this moment, after the charging is stopped at some moment later, mutual charging will occur between the battery branches, which will cause the SOCs of the battery cells to exceed their maximum SOCs, thus resulting in overcharging of the battery cells. Therefore, in the case where it is judged at a certain moment that, if the charging of the battery pack is stopped at this moment and after mutual charging between the battery branches, the SOC of the battery cell with the highest SOC in the battery branch receiving charge just reaches the maximum SOC it can accommodate, then it can be determined that the charging of the battery pack is to be stopped.

By judging in sequence whether the SOCs of the battery cells in the battery branches reach the maximum SOCs that they can accommodate after the charging of the battery pack is stopped at various moments in the charging process and the mutual charging of the battery branches is completed, it can be determined whether to stop the charging of the battery pack at a certain moment based on the judgement result. In other words, in the process of charging control of the battery pack, consideration is given as to, after mutual charging between the battery branches in the battery pack is completed after charging is stopped, whether the SOCs of the battery cells in the battery branches exceed the maximum SOCs that they can accommodate, thus achieving control of the charging of the battery pack (i.e., control of whether to stop charging). In this way, it is possible to avoid the problem of overcharging of the battery cells in the battery branches due to the mutual charging between the battery branches in the battery pack after the charging of the battery pack is completed, thereby prolonging the service life of the battery pack and reducing the probability of explosions, combustions and other safety hazards occurring in the battery pack.

The charging control method for a battery pack, the charging control apparatus for a battery pack for a battery pack, the electronic device, and the storage medium provided by embodiments of the present application can be used, but not limited to, in mobile phones, tablets, laptop computers, electric toys, electric tools, battery cars, electric vehicles, ships, spacecraft, and other powered devices that include a battery pack. Among them, electric toys may include stationary or mobile electric toys, for example, game consoles, electric vehicle toys, electric ship toys, and electric aircraft toys, and the like. Spacecraft may include aircraft, rockets, space shuttles and spacecraft, and the like. The charging control method for a battery pack, the charging control apparatus for a battery pack, the electronic device, and the storage medium provided by the embodiments of the present application can avoid the problem of overcharging of battery cells in a battery pack in a powered device after the charging of the battery pack is completed, thus prolonging the service life of the battery pack and reducing safety hazards associated with the overcharging of the battery pack.

An embodiment of the present application provides a charging control method for a battery pack. FIG. 1 is a schematic structural diagram of a battery pack in an embodiment of the present application. With reference to FIG. 1, in the battery pack, at least two groups of batteries 101 connected in parallel are included, and in each group of batteries 101, there are multiple battery cells 1011 connected in series. Of course, in each group of batteries 101, it is possible that there exists only one battery cell 1011. The specific number of battery cells 1011 in each group of batteries 101 is not limited herein. The charging control method for a battery pack provided in the embodiment of the present application is for the purpose of charging control of the battery pack shown in FIG. 1.

Figure 2:
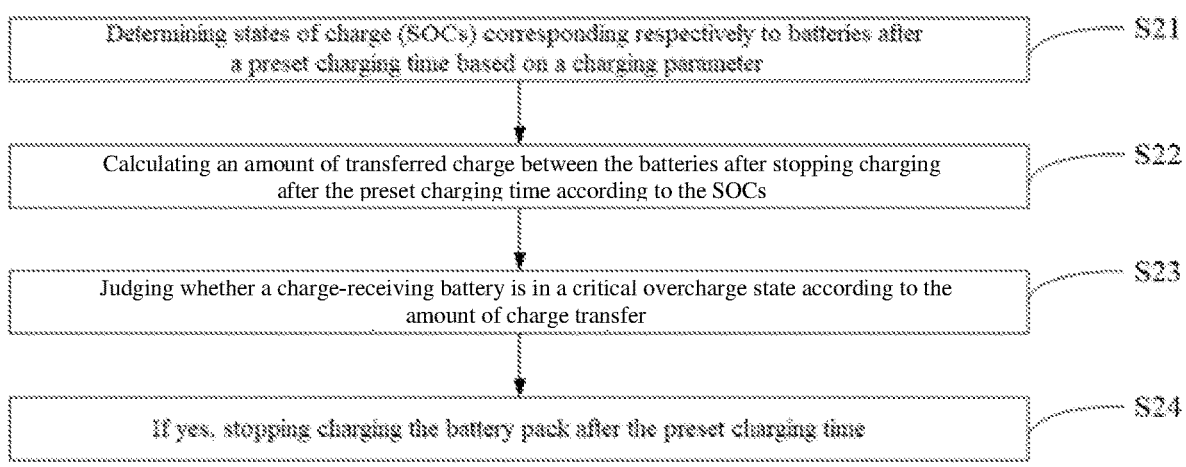
FIG. 2 is a schematic flowchart of a charging control method for a battery pack in an embodiment of the present application.

FIG. 2 is a schematic flowchart of a charging control method for a battery pack in an embodiment of the present application. With reference to FIG. 2, the method may include:

S21: determining states of charge (SOCs) corresponding respectively to the batteries after a preset charging time based on a charging parameter.

In the process of charging the battery pack, when charging is stopped at a certain moment, due to impedance mismatch between the groups of batteries in the battery pack, differences are caused in the open-circuit voltages of the groups of batteries at that moment, and the battery with a relatively high open-circuit voltage will charge the battery with a relatively low open-circuit voltage, that is, mutual charging is conducted. The process of mutual charging is actually the process of charge transfer. In order to avoid overcharging of battery cells in a battery with a relatively low open-circuit voltage after mutual charging due to the receiving of an amount of charge that exceeds what they can accommodate, it is necessary to determine the SOCs corresponding respectively to the batteries after charging of the battery pack is stopped at that moment (i.e., a preset charging time) and before mutual charging of the batteries in the battery pack is conducted.

In order to determine the SOCs corresponding respectively to the batteries after the preset charging time, the determination may be performed in the following two different time periods during the specific implementation.

Time Period I: During the Process of Charging the Battery Pack.

That is, during the process of charging the battery pack, the SOCs corresponding to the batteries at the current moment are determined in real time based on the charging parameter.

Here, the charging parameter may be a parameter obtained from real-time measurements. Specifically, the charging parameter may refer to the current open-circuit voltages corresponding respectively to the groups of batteries. Through a conversion relationship between open-circuit voltages and SOCs, it is possible to determine the SOCs of the batteries corresponding respectively to the open-circuit voltages.

Of course, the charging parameter may also refer to the open-circuit voltages corresponding respectively to the groups of batteries before charging, and the current flowing on the batteries during charging of the battery pack, as well as the current charging duration of the battery pack. Based on the current flowing on the batteries and the current charging duration of the battery pack, the amounts of charge obtained by the batteries during charging can be obtained by using the ampere-hour integration. Furthermore, the open-circuit voltages of the batteries before charging are converted to SOCs, and then the SOCs of the batteries before charging are added respectively to the amounts of charge obtained during charging, so that the current open-circuit voltages corresponding respectively to the batteries can be obtained.

When there are multiple battery cells in a group of batteries, in order to obtain the SOCs of the batteries, the open-circuit voltage of each battery cell may be obtained, respectively, or the total open-circuit voltage of all the battery cells in the group of batteries may be directly obtained to obtain the open-circuit voltages of the group of batteries, so as to obtain the SOCs of the group of batteries. The specific way of acquiring the open-circuit voltage of the battery is not limited herein.

Time Period II: Before Charging the Battery Pack.

That is, before charging the battery pack, the SOCs corresponding to the batteries at a certain moment are predetermined based on the charging parameter.

Here, the charging parameter may be a relevant parameter of the charging power supply and the battery. Specifically, the charging parameter may refer to the voltage of the charging power supply and the internal resistance of each battery. The charging current of each battery can be obtained from the voltage of the charging power supply and the internal resistance of each battery, and then the SOC of each battery can be obtained from the charging current of each battery, the internal resistance of each battery, and the charging time.

S22: calculating an amount of transferred charge between the batteries after stopping charging after the preset charging time according to the SOCs.

Due to the impedance mismatch between the batteries, there will be differences between the voltages of the batteries after charging is stopped and thus mutual charging will be performed between the batteries, that is, there will be charge transfer between the batteries. Therefore, after determining the SOCs corresponding to the batteries after the preset charging time, it is possible to calculate the amount of transferred charge between the batteries after the charging is stopped at that preset charging time.

In general, charge flows from a battery with a relatively higher amount of charge to a battery with a relatively lower amount of charge. It is assumed that the battery with a relatively higher amount of charge is the first branch and the battery with a relatively lower amount of charge is the second branch. First, the SOC of the second branch may be subtracted from the SOC of the first branch. Then, half of the result of the subtraction is used as the amount of transferred charge. In this way, in terms of the total amount of charge, the SOC of the second branch plus the amount of transferred charge is equal to the SOC of the first branch minus the amount of transferred charge, and thus no more charge transfer takes place between the first branch and the second branch.

Of course, after determining the SOCs corresponding to the batteries after the preset charging time, it is also possible to determine in other ways the amount of transferred charge between the batteries after the charging is stopped after the preset charging time, for example, by way of equation solving. It is still assumed that the battery with a relatively higher amount of charge is the first branch and the battery with a relatively lower amount of charge is the second branch. First, on the left side of the equation, the SOC of the first branch minus the amount of transferred charge is used to represent the open-circuit voltage of the first branch after mutual charging. Then, on the right side of the equation, the SOC of the second branch plus the amount of transferred charge is used to represent the open-circuit voltage of the second branch after mutual charging. Finally, by solving the equation, it is also possible to obtain the amount of transferred charge between the batteries after the charging is stopped after the preset charging time.

The above description is based on the example of a battery pack having two batteries connected in parallel, i.e., two branches. When the battery pack has more than two batteries connected in parallel, i.e., more than two branches, it is also possible to determine the amount of transferred charge between the batteries in the above manner, simply by finally making the SOCs of the batteries in the battery pack to be balanced.

It is assumed that the battery pack has three batteries connected in parallel, i.e., the first branch, the second branch, and the third branch, and that the SOCs of these three branches decrease sequentially after charging. Then, the amount of transferred charge between any two branches (e.g., the first branch and the second branch) may be first determined in the above manner, and then the SOCs of the first branch and the second branch after the charge transfer can be determined, respectively. Then, the amounts of charge transfer between the first branch and the third branch, and between the second branch and the third branch are determined in the above manner, respectively. The sum of the two amounts of charge transfer obtained is the final required amount of transferred charge between the batteries.

It is assumed that the battery pack has four batteries connected in parallel, i.e., the first branch, the second branch, the third branch, and the fourth branch, and that the SOCs of these four branches decrease sequentially after charging. In addition to determining the amount of transferred charge according to the above three-branch approach, the amount of transferred charge between every two branches (e.g., the first branch and the second branch, and the third branch and the fourth branch) can be determined by means of the above two-branch approach, respectively, and then the SOCs of the first branch and the second branch after charge transfer, and the SOCs of the third branch and the fourth branch after the charge transfer are determined, respectively. Then, the amounts of charge transfer between the first branch and the second branch and between the third branch and the fourth branch are determined by means of the above two-branch approach, respectively. The sum of the two amounts of charge transfer obtained is the final required amount of transferred charge between the batteries.

S23: judging whether a charge-receiving battery is in a critical overcharge state according to the amount of transferred charge.

After determining the amount of transferred charge from one battery to another, if the amount of transferred charge is too large, the amount of charge already existing in the battery cells in the charge-receiving battery plus the amount of transferred charge will exceed the maximum amount of charge that the battery cells per se can accommodate, thus resulting in overcharging of that battery cells. Therefore, it is necessary to add the amount of transferred charge to the amount of charge already existing in the charge-receiving battery and judge whether the amount of charge after addition reaches the maximum amount of charge that the charge-receiving battery can accommodate, i.e., to judge whether the charge-receiving battery is in a critical overcharge state.

In the specific implementation, the amount of transferred charge needs to be attached to each battery cell in the charge-receiving battery. Therefore, the amount of transferred charge is averaged according to the number of battery cells in the charge-receiving battery, and the averaged amount of transferred charge is then attached respectively to the battery cells in the charge-receiving battery, thereby judging whether each battery cell is in a critical overcharge state after the charge is attached.

S24: if yes, stopping charging the battery pack after the preset charging time.

If it is judged that the charge-receiving battery is in the critical overcharge state after the amount of transferred charge is added, this indicates that after charging of the battery pack is stopped after the preset charging time, mutual charging of the batteries in the battery pack occurs, and the batteries in the battery pack have reached the maximum state of tolerance, and in this case, if the batteries continue to receive charge, the problem of overcharge will occur, so the power supply can be controlled to stop charging the battery pack after the preset charging time.

In contrast, if it is judged that the charge-receiving battery is in not the critical overcharge state after the amount of transferred charge is added, this indicates that after charging of the battery pack is stopped after the preset charging time, even if mutual charging of the batteries in the battery pack occurs, the problem of overcharging of the batteries in the battery pack will not occur, so the power supply can be controlled to continue charging the battery pack after the preset charging time.

In other words, in the process of charging the battery pack, it is possible to predict in real time the amount of transferred charge between batteries after the charging of the battery pack is stopped at the current moment, and then judge whether the charge-receiving battery is in the critical overcharge state, and then determine whether to stop charging the battery pack at the current moment, so as to ensure that mutual charging between the batteries after charging is stopped will not cause the problem of overcharging of the batteries, thereby increasing the service life of the batteries.

Of course, it is also possible to predict, in sequence before charging the battery pack, the amount of transferred charge between batteries after the charging of the battery pack is stopped at each moment in accordance with the charging duration, and then judge whether the charge-receiving battery is in the critical overcharge state, and then determine whether to stop charging the battery pack at a certain moment, so as to ensure that mutual charging between the batteries after charging is stopped will not cause the problem of overcharging of the batteries, thereby increasing the service life of the batteries.

From the above, it can be seen that in the charging control method for a battery pack provided by the embodiments of the present application, the amount of transferred charge between the batteries after stopping charging after the preset charging time is calculated according to the SOCs corresponding respectively to the batteries in the battery pack after the preset charging time, thereby judging whether the charge-receiving battery is in the critical overcharge state based on the amount of transferred charge, and if yes, the charging of the battery pack is stopped after the preset charging time. In this way, after the charging of the battery pack is completed, even if there exists mutual charging between batteries in the battery pack, battery cells in the batteries will not be overcharged after the receiving of charge, thus extending the service life of the battery pack and reducing the probability of safety hazards of the battery pack.

Figure 3:
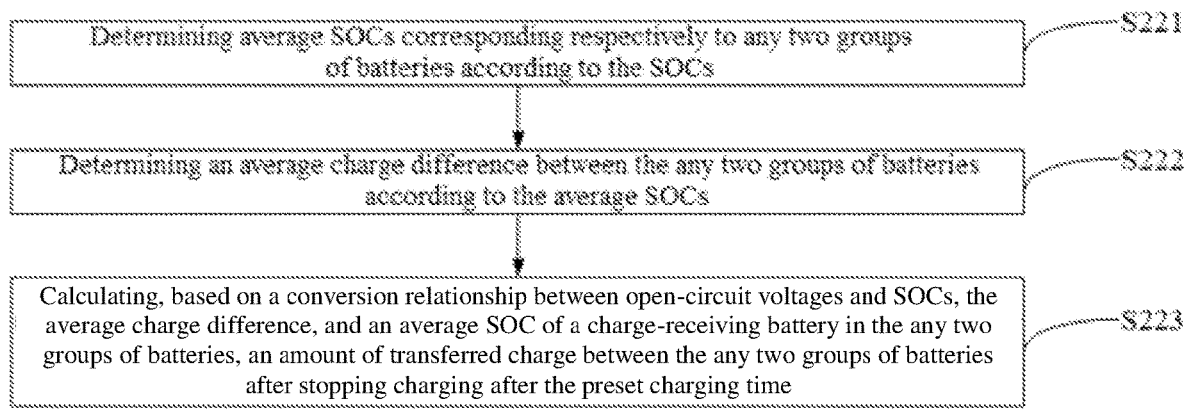
FIG. 3 is a schematic flowchart of determining an amount of transferred charge in an embodiment of the present application.

Based on the above embodiment, FIG. 3 is a schematic flowchart for determining an amount of transferred charge in an embodiment of the present application. With reference to FIG. 3, when calculating the amount of transferred charge between the batteries after stopping charging after the preset charging time according to the SOCs, that is, in step S22, the following may be specifically included:

S221: determining average SOCs corresponding respectively to any two groups of batteries according to the SOCs.

Here, the SOC is a collection of cell SOCs corresponding respectively to battery cells in the batteries. The any two groups of batteries are two groups of batteries having a relationship of charge transfer.

In other words, the SOC of each battery cell of each battery in the battery pack is known, and for any two groups of batteries with a relationship of charge transfer, the average SOC of all the battery cells in each group of batteries can be obtained through average calculations.

S222: determining an average charge difference between the any two groups of batteries according to the average SOCs.

After determining the average SOCs corresponding respectively to the any two groups of batteries, the average charge difference between the any two groups of batteries is obtained by performing subtraction between the average SOCs corresponding respectively to the two groups of batteries.

S223: calculating, based on a conversion relationship between open-circuit voltages and SOCs, the average charge difference, and an average SOC of a charge-receiving battery in the any two groups of batteries, an amount of transferred charge between the any two groups of batteries after stopping charging after the preset charging time.

Here, the conversion relationship between open-circuit voltages and SOCs may be a function. In this function, the SOC is an independent variable and the open-circuit voltage is a dependent variable. For example:

$$OCV(x) = \sum_{k=0}^{n} x^k,$$

where x denotes the SOC, OCV denotes the open-circuit voltage, and k is a parameter.

Figure 4:
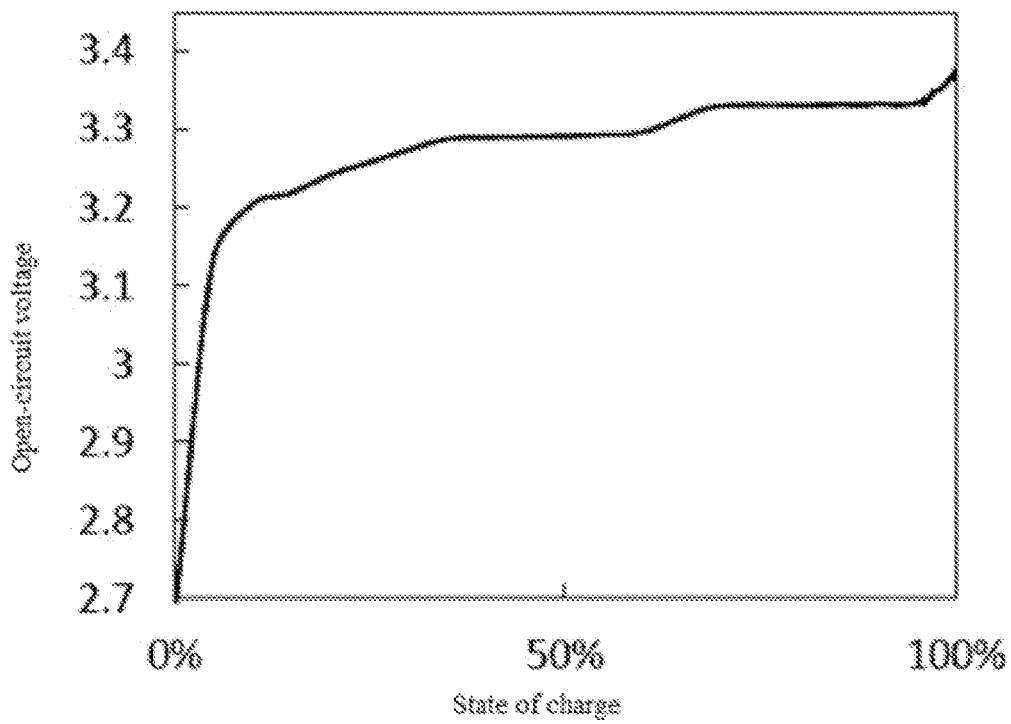
FIG. 4 is schematic diagram I of the correspondence between open-circuit voltages and SOCs in an embodiment of the present application.

Of course, the conversion relationship between open-circuit voltages and SOCs may be a pre-calibrated diagram of the correspondence between open-circuit voltages and SOCs of batteries or battery cells. FIG. 4 is schematic diagram I of the correspondence between open-circuit voltages and SOCs in an embodiment of the present application. In this figure, the horizontal coordinate may represent the SOC and the vertical coordinate may represent the open-circuit voltage. Of course, the conversion relationship between open-circuit voltages and SOCs may also be reflected in other forms, which will not be specifically limited herein.

The average SOC of the charge-receiving battery can be obtained from S221, and the average charge difference between the two batteries can be obtained from S222, and then in combination with the conversion relationship between open-circuit voltages and SOCs and taking the open-circuit voltage of the charge-receiving battery being the same as the open-circuit voltage of the charge-sending battery after the charge transfer as a benchmark, through the conversion between open-circuit voltages and SOCs, it is possible to calculate the amount of transferred charge between any two groups of batteries after the charging is stopped after the preset charging time.

From the above, it can be seen that the average charge difference between the two groups of batteries is calculated through the average SOCs corresponding respectively to the two groups of batteries, and since there are often a plurality of battery cells in a battery while the SOCs of the battery cells may be different, by using the average SOC, the SOC level of each battery cell can be more realistically represented, and thus the amount of transferred charge between the two groups of batteries can be more accurately determined.

Based on the above embodiment, when calculating, based on a conversion relationship between open-circuit voltages and SOCs, the average charge difference, and an average SOC of a charge-receiving battery in the any two groups of batteries, an amount of transferred charge between the any two groups of batteries after stopping charging after the preset charging time, that is, in step S223, the following may be specifically included:

calculating the amount of transferred charge between the any two groups of batteries after stopping charging after the preset charging time according to $OCV(SOC_{avg} + k \cdot SOC_{trans}) = OCV(SOC_{avg} + \Delta SOC - SOC_{trans})$ Equation (1).

Here, OCV( ) denotes the conversion relationship between open-circuit voltages and SOCs; $SOC_{avg}$ denotes the average SOC of the charge-receiving battery; $\Delta SOC$ denotes the average charge difference between the any two groups of batteries; k denotes a battery aging factor; and $SOC_{trans}$ denotes the amount of transferred charge between the any two groups of batteries.

In the specific calculation process, the following steps may be included:

Step 1-1: in Equation (1), setting $SOC_{trans}=0$.

Step 1-2: judging whether Equation (1) is satisfied; if it is, keeping the value set for $SOC_{trans}$ at this moment; and if it is not, proceeding to step 1-3.

Step 1-3: resetting $SOC_{trans}=SOC'_{trans}+0.01$ and returning to step 1-2. Here, $SOC'_{trans}$ is the value set in step 1-1.

Of course, it is also possible to use data for solution directly. Specifically, the open-circuit voltage of the charge-receiving battery after mutual charging, the open-circuit voltage of the charge-sending battery after mutual charging, the average SOC of the charge-receiving battery, the average charge difference between the two batteries, and the battery aging factor are acquired, and then the amount of transferred charge can be calculated by substituting the above data into Equation (1). For the specific way of calculating the amount of transferred charge by Equation (1), it is not limited herein.

From the above, it can be seen that in the process of calculating the amount of transferred charge between the two batteries based on the conversion relationship between open-circuit voltages and SOCs, the average charge difference between the two batteries, and the average SOC of the charge-receiving battery in the two batteries, the aging condition of the charge-receiving battery is fully considered, that is, the amount of charge that the charge-receiving battery can actually receive; moreover, by including the battery aging factor in the calculation of the amount of transferred charge, it is possible to more accurately determine the amount of transferred charge between the two batteries, and thus more accurately determine whether the charge-receiving battery will reach the critical overcharge state after the charging is stopped at a preset time, and thus more accurately control the charging of the battery pack.

Based on the above embodiment, before calculating the amount of transferred charge between the any two groups of batteries after stopping charging after the preset charging time according to $OCV(SOC_{avg}+k \cdot SOC_{trans})=OCV(SOC_{avg}+\Delta SOC-SOC_{trans})$, in order to determine the battery aging factor k in Equation (1), the following may specifically be included:

Step A1: acquiring a theoretical open-circuit voltage and an actual open-circuit voltage of the charge-receiving battery after a previous mutual charging of the any two groups of batteries.

In other words, before charging the battery pack this time, the parameters for the previous charging of the battery pack are acquired. Specifically, the following are acquired: the actual open-circuit voltage of the charge-receiving battery that is measured with a voltage measurement instrument after the previous charging of the battery pack is completed and mutual charging of the batteries in the battery pack is completed; as well as the theoretical open-circuit voltage of the charge-receiving battery after stopping charging after the preset charging time that is calculated in advance during the previous charging control.

Step A2: judging whether the theoretical open-circuit voltage is equal to the actual open-circuit voltage; if yes, executing step A3; and if not, executing step A4.

If the theoretical open-circuit voltage is equal to the actual open-circuit voltage, it means that the charge-receiving battery did not further age during the previous charging process, then the battery aging parameter used in the previous charging control can continue to be used in the charging control this time.

If the theoretical open-circuit voltage is not equal to the actual open-circuit voltage, it means that the charge-receiving battery has further aged during the previous charging process and the theoretical open-circuit voltage theoretically calculated is different from the actual open-circuit voltage actually measured in the end, then the battery aging parameter needs to be corrected in the charging control this time.

Step A3: if yes, using a battery aging factor used during a previous charging process as the battery aging factor.

Step A4: determining the battery aging factor according to $$OCV(SOC_{avg}+k \cdot SOC_{trans-calculated})=$$ Equation (2)
$$OCV(SOC_{avg}+\Delta SOC-SOC_{trans-actual}) \text{ or}$$

$$k = \frac{SOC_{trans-actual}}{SOC_{trans-calculated}}.$$ Equation (3)

Here, OCV( ) denotes the conversion relationship between open-circuit voltages and SOCs; $SOC_{avg}$ denotes the average SOC of the charge-receiving battery; $\Delta SOC$ denotes the average charge difference between the any two groups of batteries; k denotes the battery aging factor; and $SOC_{trans-calculated}$ denotes a previous theoretical amount of transferred charge between the any two groups of batteries; and $SOC_{trans-actual}$ denotes a previous actual amount of transferred charge between the any two groups of batteries;

The following steps may be included in the process of determining the battery aging factor according to Equation (2):

Step 2-1: In Equation (2), setting k=1.
Step 2-2: judging whether Equation (2) is satisfied; if it is, keeping the value set for k at this moment; and if it is not, proceeding to step 2-3.
Step 2-3: resetting k=k'−0.01 and returning to step 2-2. Here, k' is the value set in step 2-1.

Of course, it is also possible to use Equation (3) for solution directly. In other words, the theoretical amount of transferred charge obtained from the theoretical calculation during the previous charging process is directly divided by the actual amount of transferred charge obtained from the actual measurement. The specific way of determining the aging factor is not limited herein.

From the above, it can be seen that during each charging control of the battery pack, the battery aging parameter needs to be corrected, so that it is possible to accurately estimate during each charging control the actual amount of charge gained by the charge-receiving battery, and thus to more accurately determine whether the charge-receiving battery will reach a critical overcharge state after the charging is stopped at a preset time, thereby more accurately controlling the charging of the battery pack.

Based on the above embodiment, when determining the average SOCs corresponding respectively to the any two groups of batteries according to the SOCs, that is, in step S221, the following may specifically be included:

Step B1: acquiring total open-circuit voltages and total numbers of battery cells corresponding respectively to the any two groups of batteries.

The SOC of the battery is not easy to acquire directly, while the open-circuit voltage of the battery is easy to acquire, that is, the open-circuit voltage of the battery can be measured by the voltage measurement instrument.

The number of battery cells in a battery is already determined after the design of battery is completed, so the total number of battery cells in the battery can be acquired from the design parameters of the battery.

Step B2: determining average open-circuit voltages corresponding respectively to the any two groups of batteries according to the total open-circuit voltages and the total numbers.

After obtaining the total open-circuit voltages and the total numbers of battery cells corresponding respectively to the two batteries, the average open-circuit voltages corresponding respectively to the two batteries can be obtained by dividing the total open-circuit voltages by the total numbers.

Step B3: determining an average SOC of the any two groups of batteries based on the average open-circuit voltages and the conversion relationship between open-circuit voltages and SOCs.

The SOC of the battery cannot be acquired directly through measurements, so after obtaining the average open-circuit voltages corresponding respectively to the two batteries, the average SOCs corresponding respectively to the two batteries can be obtained through the conversion relationship between open-circuit voltages and SOCs.

In fact, with the Battery Management System (BMS), the open-circuit voltage of each battery cell in the battery can be obtained, respectively, but there is a certain error every time the open-circuit voltage of a battery cell is acquired, and thus adding up the open-circuit voltages of all the battery cells in the battery will cause a greater error in the open-circuit voltage of the battery as a whole. Therefore, with the way of obtaining the total open-circuit voltage of the battery directly, by one acquisition, it is possible to reduce the error of the total voltage of the battery, thus making the determination of the SOCs of the two batteries more accurate.

Figure 5:
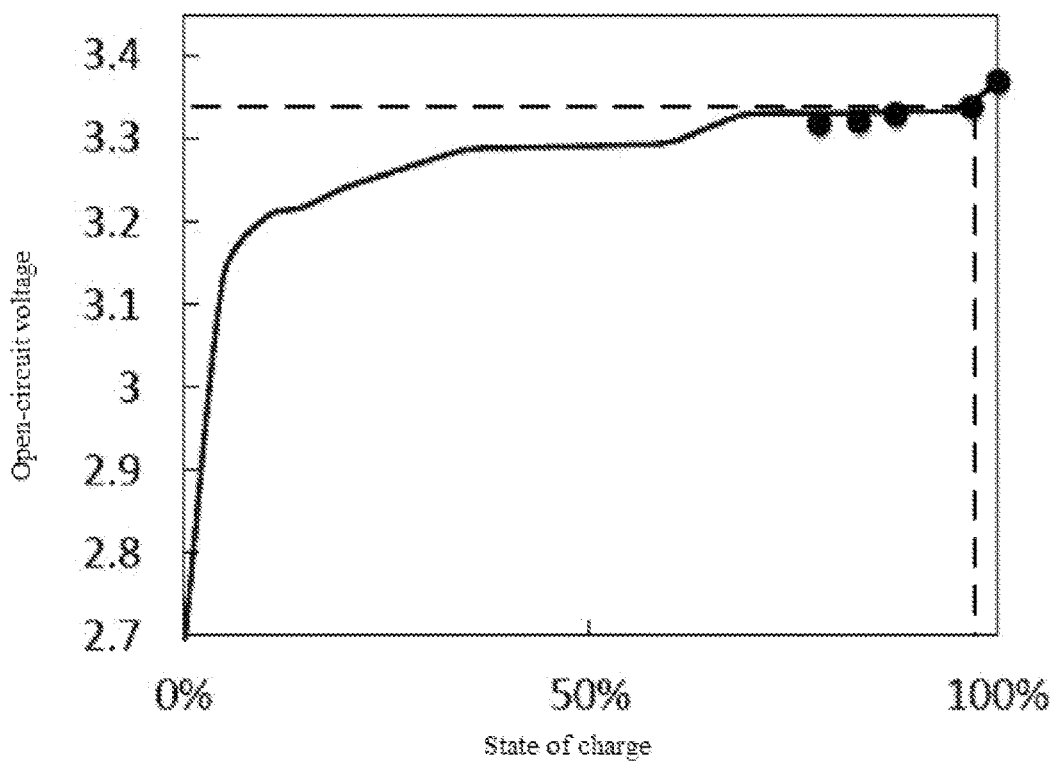
FIG. 5 is schematic diagram II of the correspondence between open-circuit voltages and SOCs in an embodiment of the present application.

FIG. 5 is schematic diagram II of the correspondence between open-circuit voltages and SOCs in an embodiment of the present application. In this figure, the horizontal coordinate may represent the SOC and the vertical coordinate may represent the open-circuit voltage. After obtaining the average open-circuit voltages corresponding respectively to the two groups of batteries, the average SOCs corresponding respectively to the two groups of batteries can be obtained through the correspondence in FIG. 5. That is, a horizontal straight line is drawn from the corresponding average open-circuit voltage value on the vertical coordinates, and the point where it intersects with the curve in FIG. 5 is then found, and a vertical line is then drawn from that point, and the SOC corresponding to the intersection of the vertical line with the horizontal coordinates is the average SOC corresponding to each of the two groups of batteries.

From the above, it can be seen that the open-circuit voltage of each battery cell is acquired, and the open-circuit voltages of the battery cells are added up to obtain the total open-circuit voltage of the battery. Since there is a certain error in the acquisition of the open-circuit voltage of each battery cell, there will be a large error in the total open-circuit voltage of the battery obtained by adding the open-circuit voltages of the battery cells. By directly obtaining the total open-circuit voltage of the batteries and determining the average open-circuit voltage of the battery based on the total open-circuit voltage of the batteries so as to determine the average SOC of the battery, the error in the acquisition of the total open-circuit voltage of the batteries can be reduced, and thus the accuracy of determining the average SOC of the battery can be improved, and thus the amount of transferred charge can be determined more accurately, thus improving the accuracy of charging control of the battery pack to more accurately avoid overcharging of the battery.

Figure 6:
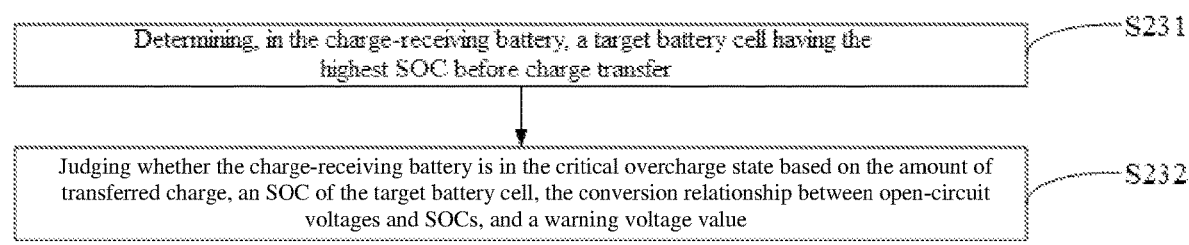
FIG. 6 is a schematic flowchart of judging whether a charge-receiving battery is in a critical overcharge state in an embodiment of the present application.

Based on the above embodiment, FIG. 6 is a schematic flowchart of judging whether a charge-receiving battery is in a critical overcharge state in an embodiment of the present application. With reference to FIG. 6, when judging whether a charge-receiving battery is in a critical overcharge state according to the amount of transferred charge, that is, in step S23, the following may specifically be included:

S231: determining, in the charge-receiving battery, a target battery cell having the highest SOC before charge transfer.

In the charge-receiving battery, if there exist multiple battery cells, among the multiple battery cells, a target battery cell having the highest SOC before charge transfer needs to be found first. This is because: if this battery cell does not have the problem of overcharging after mutual charging, the other battery cells in the charge-receiving battery will not have the problem of overcharging either. Later, it is only necessary to judge whether that target battery cell will be in the critical overcharge state after receiving the transferred charge, which can improve the efficiency of determining whether the battery is in the critical overcharge state, thus improving the real-time performance of the charging control of the battery pack.

S232: judging whether the charge-receiving battery is in the critical overcharge state based on the amount of transferred charge, an SOC of the target battery cell, the conversion relationship between open-circuit voltages and SOCs, and a warning voltage value.

After obtaining the SOC of the target battery cell, in combination with the amount of transferred charge and the conversion relationship between open-circuit voltages and SOCs, the open-circuit voltage of the target battery cell after mutual charging can be known. Further, the open-circuit voltage of the target battery cell after mutual charging is compared with the warning voltage value, and based on the result of comparison, it is possible to determine whether the charge-receiving battery is in the critical overcharge state.

Specifically, if the open-circuit voltage of the target battery cell after mutual charging is less than the warning voltage value, which indicates that the target battery cell will not have the problem of overcharging after charging is stopped at this time and mutual charging occurs, then it is determined that the charge-receiving battery is not in the critical overcharge state. If the open-circuit voltage of the target battery cell after mutual charging is equal to the warning voltage value, which indicates that the target battery cell will not have the problem of overcharging after charging is stopped at this time and mutual charging occurs, but if charging continues at the next moment, the target battery cell will be overcharged after charging is stopped and mutual charging occurs, then it is determined that the charge-receiving battery has just reached the critical overcharge state. If the open-circuit voltage of this target battery cell after mutual charging is greater than the warning voltage value, which indicates that the target battery cell will have the problem of overcharging after charging is stopped at this time and mutual charging occurs, then it is determined that the charge-receiving battery is already in the critical overcharge state.

From the above, it can be seen that by determining whether the charge-receiving battery will be overcharged after charging is stopped after the preset charging time based on whether the target battery cell with the highest SOC in the charge-receiving battery before the charge transfer will be overcharged after charging is stopped after the preset charging time, it is possible to reduce the amount of calculation of the SOC of the battery and thus improve the speed of determining whether the battery is in the critical overcharge state, thereby improving the real-time performance of charging control of the battery pack.

Based on the above embodiment, when judging whether the charge-receiving battery is in the critical overcharge state based on the amount of transferred charge, an SOC of the target battery cell, the conversion relationship between open-circuit voltages and SOCs, and a warning voltage value, that is, in step S232, the following may specifically be included:

Step C1: judging whether $OCV(SOC_{avg}+\Delta SOC_{abn}-k\cdot SOC_{trans})\leq V_{warning}$ is satisfied; if yes, executing step C2; and if not, executing step C3.

Step C2: determining that the charge-receiving battery is not in the critical overcharge state.

Step C3: determining that the charge-receiving battery is in the critical overcharge state.

Here, $OCV(\ )$ denotes the conversion relationship between open-circuit voltages and SOCs, $SOC_{avg}$ denotes the average SOC of the charge-receiving battery, $\Delta SOC_{abn}$ denotes a difference between the SOC of the target battery cell and $SOC_{avg}$, k denotes a battery aging factor, $SOC_{trans}$ denotes the amount of transferred charge between the any two groups of batteries, and $V_{warning}$ denotes the warning voltage value.

Figure 7:
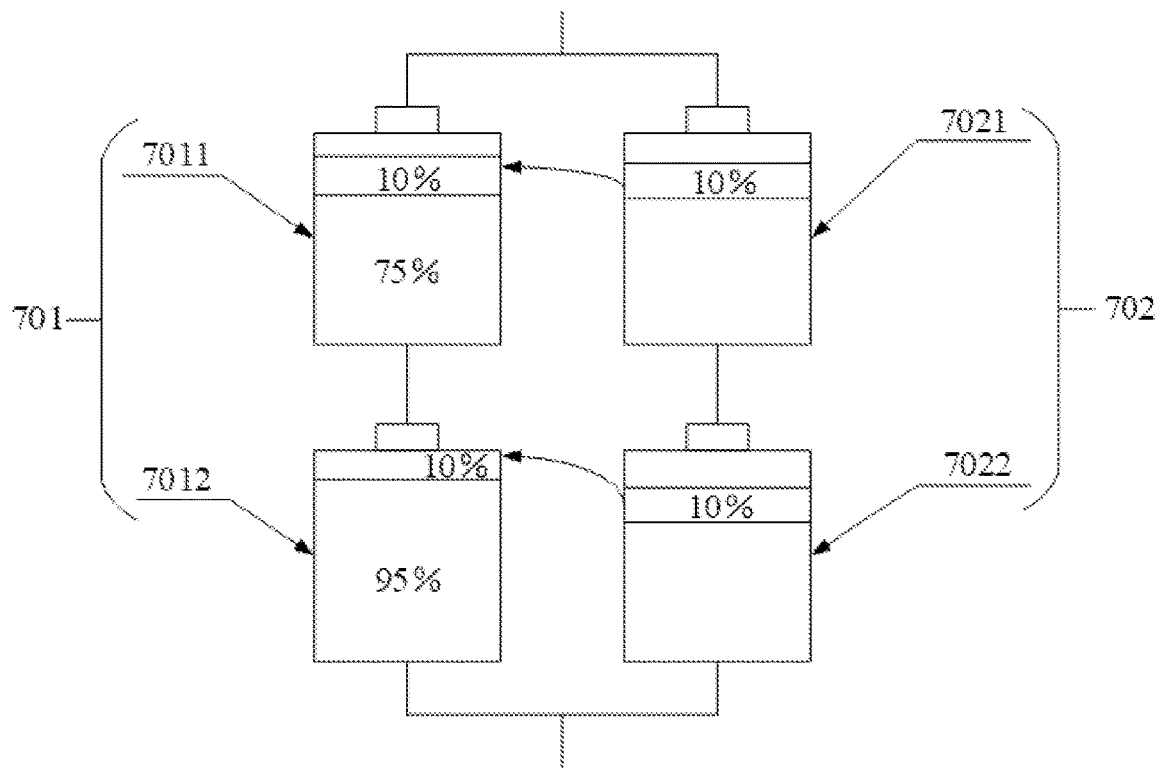
FIG. 7 is a schematic diagram of the SOCs of battery cells in batteries after mutual charging in an embodiment of the present application.

FIG. 7 is a schematic diagram of the SOCs of battery cells in batteries after mutual charging in an embodiment of the present application. With reference to FIG. 7, in the battery pack, a first battery 701 is connected in parallel with a second battery 702. In the first battery 701, a first battery cell 7011 is connected in series with a second battery cell 7012. In the second battery 702, a third battery cell 7021 is connected in series with a fourth battery cell 7022. It is assumed that the second battery 702 transfers 20% of the amount of charge thereof to the first battery 701 (10% from each of the third battery cell 7021 and the fourth battery cell 7022, respectively). Before transferring the charge, the SOC of the first battery cell 7011 is 75% and the SOC of the second battery cell 7012 is 95%. Then, after the transfer of charge, the first battery cell 7011 receives 10% of the amount of transferred charge, and when added to the original SOC of 75%, the SOC of the first battery cell 7011 is 85%, and the corresponding open-circuit voltage does not exceed the warning voltage value. The second battery cell 7012 receives 10% of the amount of transferred charge, and when added to the original SOC of 95%, the SOC of the second battery cell 7012 is 105% and the corresponding open-circuit voltage has reached the warning voltage value, then at this time it is necessary to control to stop charging the battery pack. In this way, after charging is stopped and mutual charging is conducted, the battery pack reaches the maximum state of charge and the charge-receiving battery will not be overcharged.

From the above, it can be seen that when determining the open-circuit voltage of the target battery cell after charge transfer that has the highest SOC in the charge-receiving battery before charge transfer, the battery aging parameter is still considered during the transfer of charge to the target battery cell, that is, the actual amount of charge received by the target battery cell is taken into account, which makes it possible to improve the accuracy of determining the open-circuit voltage of the target battery cell after mutual charging and thus more accurately determine whether the charge-receiving battery is in the critical overcharge state, thereby improving the accuracy of charging control of the battery pack.

Figure 8:
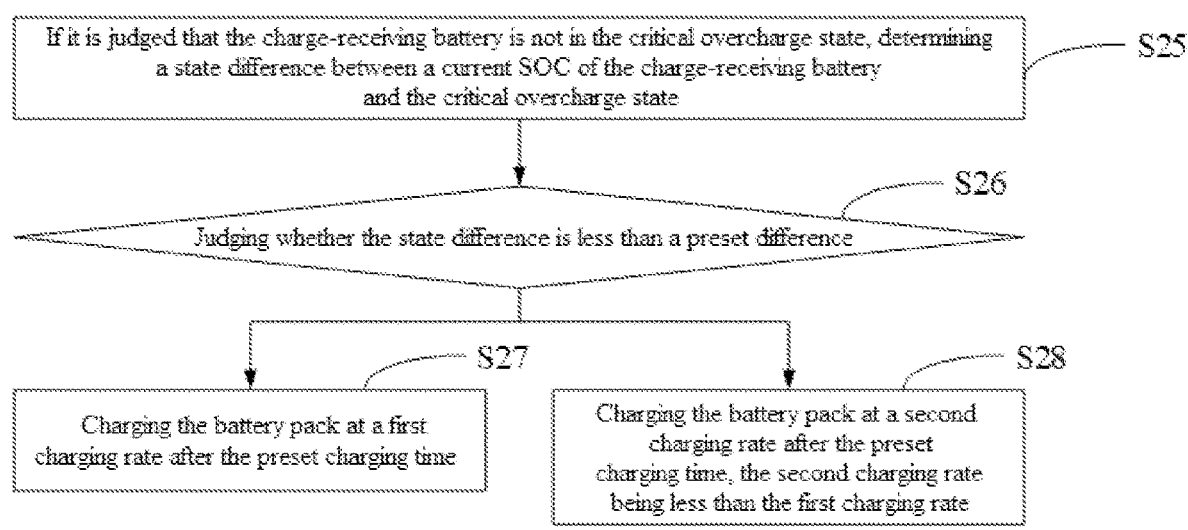
FIG. 8 is a schematic flowchart of a further charging control process after determining that the battery is not in the critical overcharge state in an embodiment of the present application.

Based on the above embodiment, FIG. 8 is a schematic flowchart of a further charging control process after determining that the battery is not in a critical overcharge state in an embodiment of the present application. With reference to FIG. 8, after said judging whether a charge-receiving battery is in the critical overcharge state according to the amount of transferred charge, the process further includes:

S25: if it is judged that the charge-receiving battery is not in the critical overcharge state, determining a state difference between a current SOC of the charge-receiving battery and the critical overcharge state.

S26: judging whether the state difference is less than a preset difference; if not, executing S27; and if yes, executing S28.

S27: charging the battery pack at a first charging rate after the preset charging time.

S28: charging the battery pack at a second charging rate after the preset charging time, the second charging rate being less than the first charging rate.

Specifically, when the state difference between the current SOC of the charge-receiving battery and the critical overcharge state is greater than or equal to the preset difference, it indicates that the charge-receiving battery is still far from the critical overcharge state, so the battery pack can be charged at the larger first charging rate after the preset charging time. When the state difference between the current SOC of the charge-receiving battery and the critical overcharge state is less than the preset difference, it indicates that the charge-receiving battery is close to the critical overcharge state. Therefore, in order to avoid the situation where, due to too fast charging of the battery pack, it is too late to judge whether the battery will be overcharged at a certain moment, which in turn leads to overcharging, the battery pack needs to be charged at the smaller second charging rate after the preset charging time.

In practical applications, the first charging rate may be the normal charging rate, i.e., 100%, or the fast charging rate, i.e. greater than 100%. The second charging rate is a low charging rate, i.e., less than 100%. The specific values of the first charging rate and the second charging rate are not limited herein.

From the above, it can be seen that the subsequent charging rate for the battery pack is determined according to the magnitude of the state difference between the current SOC of the charge-receiving battery and the critical overcharge state. When the state difference is large, the battery pack may be continued to be charged at a high charging rate, which can shorten the charging time of the battery pack and improve the charging efficiency of the battery pack. When the state difference is small, the battery pack may be continued to be charged at a low charging rate, which can avoid the battery from quickly passing the critical overcharge state, and can accurately control to stop charging when the battery is about to reach the critical overcharge state, thus improving the accuracy of charging control.

Figure 9:
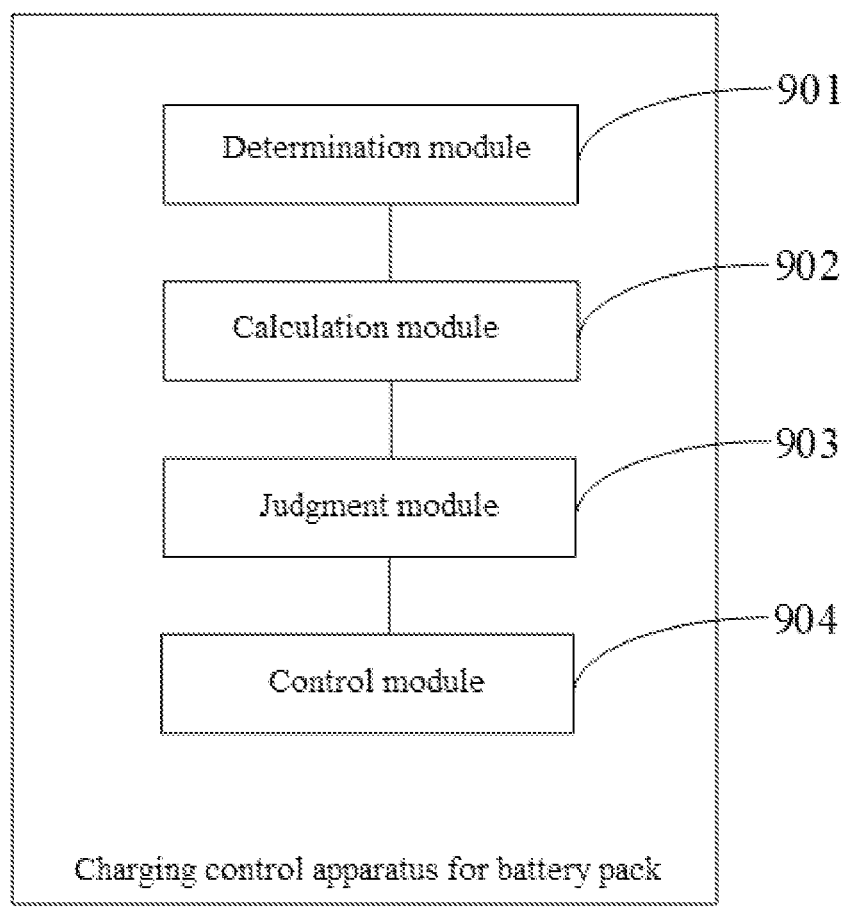
FIG. 9 is schematic structural diagram I of a charging control apparatus for a battery pack in an embodiment of the present application.

Based on the same inventive concept, as an implementation of the above method, the embodiments of the present application further provide a charging control apparatus for a battery pack. FIG. 9 is schematic structural diagram I of a charging control apparatus for a battery pack in an embodiment of the present application. With reference to FIG. 9, the apparatus may include:

a determination module 901 for determining SOCs corresponding respectively to the batteries after a preset charging time based on a charging parameter;

a calculation module 902 for calculating an amount of transferred charge between the batteries after stopping charging after the preset charging time according to the SOCs;

a judgement module 903 for judging whether a charge-receiving battery is in a critical overcharge state according to the amount of transferred charge; and a control module 904 for: if yes, stopping charging the battery pack after the preset charging time.

Figure 10:
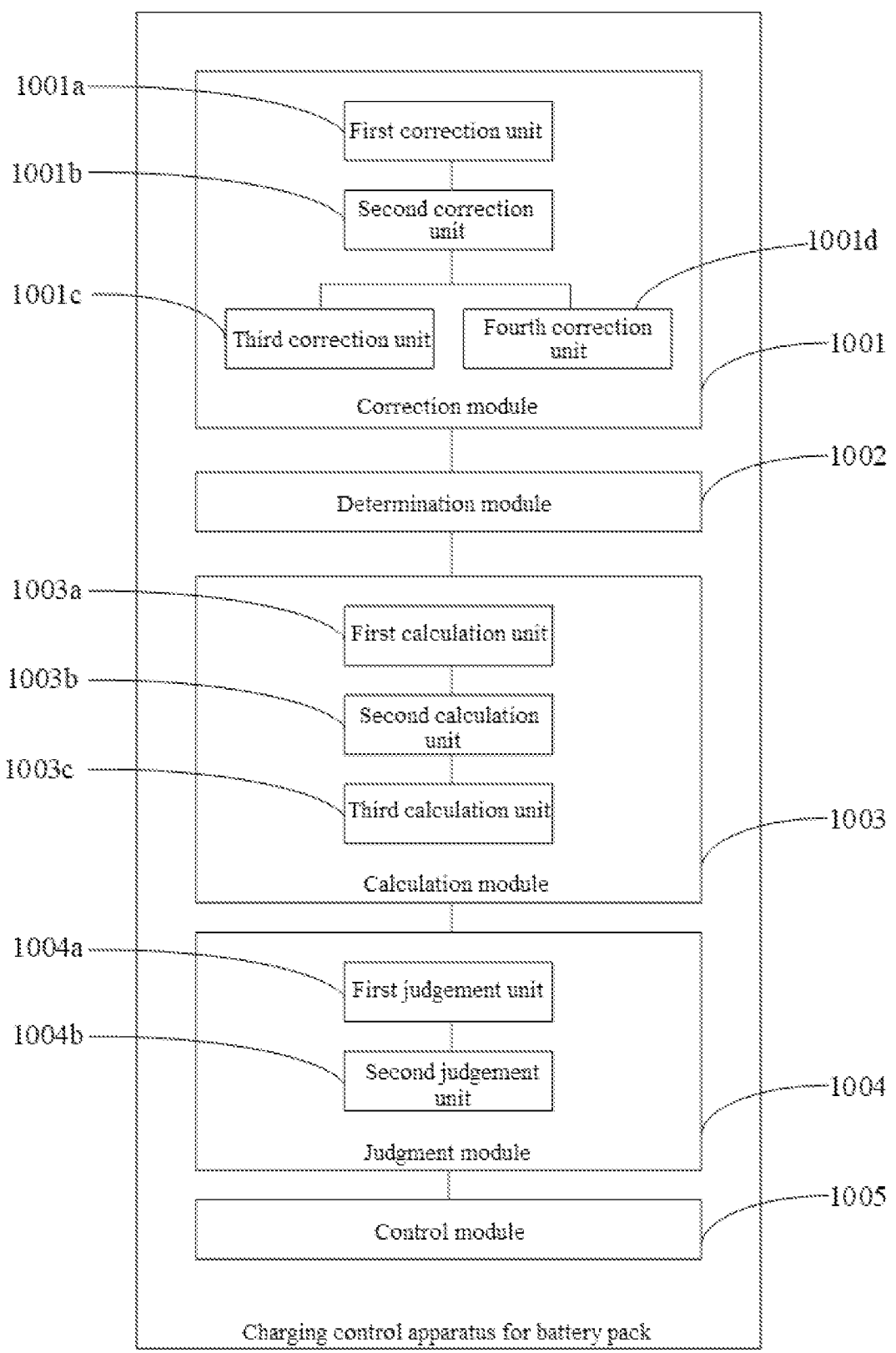
FIG. 10 is schematic structural diagram II of a charging control apparatus for a battery pack in an embodiment of the present application.

Further, as a refinement and extension of the apparatus shown in FIG. 9, the embodiments of the present application further provide a charging control apparatus for a battery pack. FIG. 10 is schematic structural diagram II of a charging control apparatus for a battery pack in an embodiment of the present application. With reference to FIG. 10, the apparatus may include:

a correction module 1001 which specifically includes:

a first correction unit 1001a for acquiring a theoretical open-circuit voltage and an actual open-circuit voltage of the charge-receiving battery after a previous mutual charging of the any two groups of batteries;

a second correction unit 1001b for judging whether the theoretical open-circuit voltage is equal to the actual open-circuit voltage; if yes, proceeding to a third correction unit 1001c; and if not, proceeding to a fourth correction unit 1001d;

the third correction unit 1001c for using a battery aging factor used during a previous charging process as the battery aging factor; and the fourth correction unit 1001d for determining the battery aging factor according to $$OCV(SOC_{avg} + k \cdot SOC_{trans-calculated}) =$$
$$OCV(SOC_{avg} + \Delta SOC - SOC_{trans-actual}) \text{ or}$$
$$k = \frac{SOC_{trans-actual}}{SOC_{trans-calculated}}.$$

wherein OCV( ) denotes the conversion relationship between open-circuit voltages and SOCs, $SOC_{avg}$ denotes the average SOC of the charge-receiving battery, $\Delta SOC$ denotes the average charge difference between the any two groups of batteries, k denotes the battery aging factor, $SOC_{trans-calculated}$ denotes a previous theoretical amount of transferred charge between the any two groups of batteries, and $SOC_{trans-actual}$ denotes a previous actual amount of transferred charge between the any two groups of batteries.

A determination module 1002 for determining SOCs corresponding respectively to the batteries after a preset charging time based on a charging parameter.

A calculation module 1003 which specifically includes:

a first calculation unit 1003a for determining average SOCs corresponding respectively to any two groups of batteries according to the SOCs, the any two groups of batteries being two groups of batteries having a relationship of charge transfer, wherein the SOC is a collection of cell SOCs corresponding respectively to battery cells in the batteries, wherein the first calculation unit 1003a is specifically used for acquiring total open-circuit voltages and total numbers of battery cells corresponding respectively to the any two groups of batteries; determining average open-circuit voltages corresponding respectively to the any two groups of batteries according to the total open-circuit voltages and the total numbers; and determining an average SOC of the any two groups of batteries based on the average open-circuit voltages and the conversion relationship between open-circuit voltages and SOCs;

a second calculation unit 1003b for determining an average charge difference between the any two groups of batteries according to the average SOCs; and a third calculation unit 1003c for calculating, based on a conversion relationship between open-circuit voltages and SOCs, the average charge difference, and an average SOC of a charge-receiving battery in the any two groups of batteries, an amount of transferred charge between the any two groups of batteries after stopping charging after the preset charging time, wherein the third calculation unit 1003c is specifically used for calculating the amount of transferred charge between the any two groups of batteries after stopping charging after the preset charging time according to $OCV(SOC_{avg}+k \cdot SOC_{trans})=OCV(SOC_{avg}+\Delta SOC-SOC_{trans})$, wherein OCV( ) denotes the conversion relationship between open-circuit voltages and SOCs, $SOC_{avg}$ denotes the average SOC of the charge-receiving battery, $\Delta SOC$ denotes the average charge difference between the any two groups of batteries, k denotes a battery aging factor, and $SOC_{trans}$ denotes an amount of transferred charge between any two groups of batteries.

A judgement module 1004 which specifically includes:

a first judgement unit 1004a for determining, in the charge-receiving battery, a target battery cell having the highest SOC before charge transfer; and a second judgement unit 1004b for judging whether the charge-receiving battery is in the critical overcharge state based on the amount of transferred charge, an SOC of the target battery cell, the conversion relationship between open-circuit voltages and SOCs, and a warning voltage value, wherein the second judgement unit 1004b is specifically used for determining, if $OCV(SOC_{avg}+\Delta SOC_{abn}-k \cdot SOC_{trans}) \leq V_{warning}$ is satisfied, that the charge-receiving battery is not in the critical overcharge state; and determining, if $OCV(SOC_{avg}+\Delta SOC_{abn}-k \cdot SOC_{trans}) \leq V_{warning}$ is not satisfied, that the charge-receiving battery is in the critical overcharge state, wherein OCV( ) denotes the conversion relationship between open-circuit voltages and SOCs, $SOC_{avg}$ denotes the average SOC of the charge-receiving battery, $\Delta SOC_{abn}$ denotes a difference between the SOC of the target battery cell and $SOC_{avg}$, k denotes the battery aging factor, $SOC_{trans}$ denotes the amount of transferred charge between the any two groups of batteries, the any two groups of batteries being two groups of batteries having a relationship of charge transfer, and $V_{warning}$ denotes the warning voltage value.

A control module 1005 for: if yes, stopping charging the battery pack after the preset charging time, wherein the control module 1005 is further used for: if not, determining a state difference between a current SOC of the charge-receiving battery and the critical overcharge state; and charging, when the state difference is greater than or equal to a preset difference, the battery pack at a first charging rate after the preset charging time; and charging, when the state difference is less than the preset difference, the battery pack at a second charging rate after the preset charging time, the second charging rate being less than the first charging rate.

It is noted here that the description of the above apparatus embodiments is similar to the description of the above method embodiments and has similar beneficial effects as the method embodiments. For technical details not disclosed in the apparatus embodiments of the present application, please refer to the description of the method embodiments of the present application for understanding.

Figure 11:
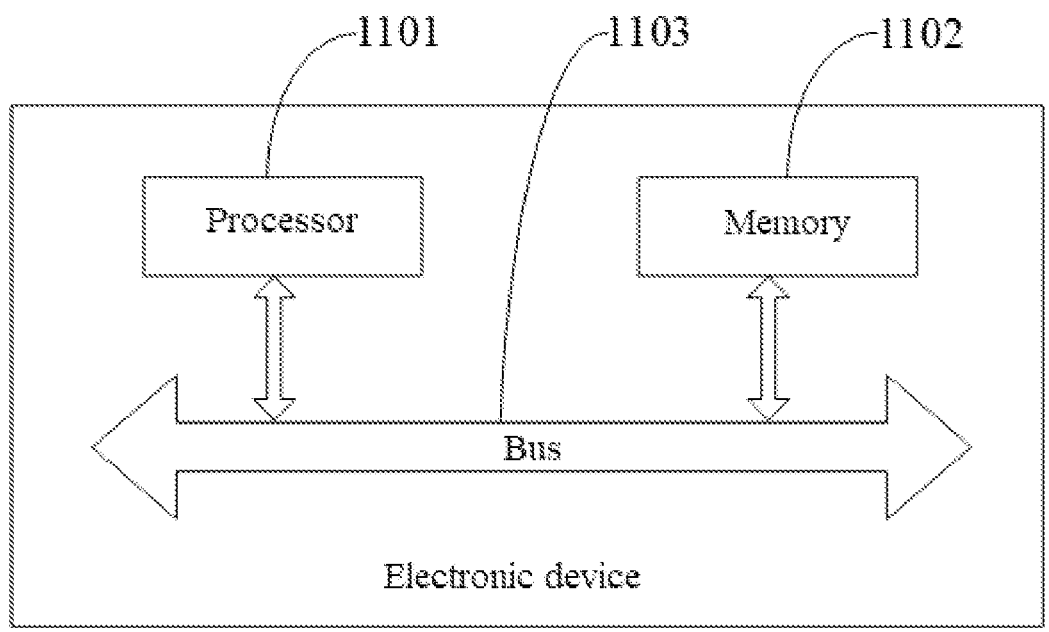
FIG. 11 is a schematic structural diagram of an electronic device in an embodiment of the present application.

Based on the same inventive concept, the embodiments of the present application further provide an electronic device. FIG. 11 is a schematic structural diagram of an electronic device in an embodiment of the present application. With reference to FIG. 11, this electronic device may include: a processor 1101, a memory 1102, and a bus 1103, wherein the processor 1101 and the memory 1102 complete communication with each other via the bus 1103; and the processor 1101 is used for invoking program instructions in the memory 1102 to perform the method in the above one or more embodiments.

It is noted here that the description of the above electronic device embodiment is similar to the description of the above method embodiments and has similar beneficial effects as the method embodiments. For technical details not disclosed in the electronic device embodiment of the present application, please refer to the description of the method embodiments of the present application for understanding.

Based on the same inventive concept, the embodiments of the present application further provide a computer-readable storage medium, which may include a stored program, wherein the program, when executed, controls a device in which the storage medium is located to execute the method in the above one or more embodiments.

It is noted here that the description of the above storage medium embodiment is similar to the description of the above method embodiments and has similar beneficial effects as the method embodiments. For technical details not disclosed in the storage medium embodiment of the present application, please refer to the description of the method embodiments of the present application for understanding.

Finally, the main process of charging control of a battery pack provided in the embodiments of the present application is summarized as follows:

First, prior to charging of the battery pack this time, determining the battery aging factor according to $$OCV(SOC_{avg} + k \cdot SOC_{trans-calculated}) =$$
$$OCV(SOC_{avg} + \Delta SOC - SOC_{trans-actual}) \text{ or}$$
$$k = \frac{SOC_{trans-actual}}{SOC_{trans-calculated}},$$

Here, OCV( ) denotes the conversion relationship between open-circuit voltages and SOCs; $SOC_{avg}$ denotes the average SOC of the charge-receiving battery; $\Delta SOC$ denotes the average charge difference between the any two groups of batteries; k denotes the battery aging factor; and $SOC_{trans-calculated}$ denotes a previous theoretical amount of transferred charge between the any two groups of batteries; and $SOC_{trans-actual}$ denotes a previous actual amount of transferred charge between the any two groups of batteries;

Then, calculating the amount of transferred charge between the any two groups of batteries after stopping charging after the preset charging time according to $OCV(SOC_{avg}+k \cdot SOC_{trans})=OCV(SOC_{avg}+\Delta SOC-SOC_{trans})$.

Here, OCV( ) denotes the conversion relationship between open-circuit voltages and SOCs; $SOC_{avg}$ denotes the average SOC of the charge-receiving battery; $\Delta SOC$ denotes the average charge difference between the any two groups of batteries; k denotes the battery aging factor; and $SOC_{trans}$ denotes the amount of transferred charge between the any two groups of batteries.

Finally, according to whether $OCV(SOC_{avg}+\Delta SOC_{abn}-k \cdot SOC_{trans}) \leq V_{warning}$ is satisfied, and in the case where it is satisfied, determining that the charge-receiving battery is not in the critical overcharge state, and thus determining to continue charging the battery pack; and in the case where it is not satisfied, determining that the charge-receiving battery is in the critical overcharge state, and thus determining to stop charging the battery pack.

Finally, it should be noted that the above embodiments are used only to illustrate, instead of limiting, the technical solutions of the present application; although the present application is described in detail with reference to the preceding embodiments, it should be understood by those of ordinary skill in the art that: it is still possible to modify the technical solutions recorded in the preceding embodiments, or to equivalently replace some or all of the technical features; and these modifications or replacements do not make the essence of the corresponding technical solutions depart from the scope of the technical solutions of the embodiments of the present application, which should be covered by the scope of the claims and specification of the present application. In particular, the various technical features mentioned in the various embodiments can be combined in any way, as long as there is no structural conflict.

The present application is not limited to the particular embodiments disclosed herein, but includes all technical solutions that fall within the scope of the claims.

The invention claimed is:

1. A charging control method for a battery pack comprising two or more batteries connected in parallel and each comprising a plurality of battery cells, the method comprising:
   determining, based on a charging parameter, states of charge (SOCs) corresponding respectively to the two or more batteries at elapsing of a preset charging time;
   calculating, prior to the elapsing of the preset charging time, according to the SOCs, an amount of charge transfer between the two or more batteries after stopping charging at the elapsing of the preset charging time;
   judging whether a charge-receiving battery cell of a charge-receiving battery is in an overcharge state according to the amount of charge transfer; and
   in response to the charge-receiving battery cell being in the overcharge state, stopping charging the battery pack at the elapsing of the preset charging time.

2. The method according to claim 1, wherein:
   the SOC of a battery is a collection of cell SOCs corresponding respectively to battery cells of the battery; and
   calculating the amount of charge transfer between the two or more batteries comprises:
      determining, according to the SOCs, a respective average SOC corresponding to each of two batteries that transfer charge between each other after charging stops;
      determining an average charge difference between the two batteries according to the average SOCs; and
      calculating, based on a conversion relationship between open-circuit voltages and SOCs, the average charge difference, and the average SOC of the charge-receiving battery in the two batteries, the amount of charge transfer between the two batteries after charging is stopped at the elapsing of the preset charging time.

3. The method according to claim 2, wherein calculating, based on the conversion relationship between open-circuit voltages and SOCs, the average charge difference, and the average SOC of the charge-receiving battery in the two batteries, the amount of charge transfer between the two batteries after charging is stopped at the elapsing of the preset charging time comprises:
   calculating the amount of charge transfer between the two batteries after charging is stopped at the elapsing of the preset charging time according to $OCV(SOC_{avg}+k \cdot SOC_{trans})=OCV(SOC_{avg}+\Delta SOC-SOC_{trans})$
   wherein OCV ( ) denotes the conversion relationship between open-circuit voltages and SOCs, SOCavg denotes the average SOC of the charge-receiving battery, $\Delta SOC$ denotes the average charge difference between the two batteries, k denotes a battery aging factor, and $SOC_{trans}$ denotes the amount of charge transfer between the two batteries.

4. The method according to claim 3, further comprising, before calculating the amount of charge transfer between the two batteries after charging is stopped at the elapsing of the preset charging time according to $OCV(SOC_{avg}+k \cdot SOC_{trans})=OCV(SOC_{avg}+\Delta SOC-SOC_{trans})$:
   acquiring a theoretical open-circuit voltage and an actual open-circuit voltage of the charge-receiving battery after a previous mutual charging of the two batteries;

judging whether the theoretical open-circuit voltage is equal to the actual open-circuit voltage;

in response to the theoretical open-circuit voltage being equal to the actual open-circuit voltage, using a battery aging factor used during a previous charging process as the battery aging factor; and in response to the theoretical open-circuit voltage being not equal to the actual open-circuit voltage, determining the battery aging factor according to $$OCV(SOC_{avg} + k \cdot SOC_{trans-calculated}) =$$
$$OCV(SOC_{avg} + \Delta SOC - SOC_{trans-actual}) \text{ or }$$
$$k = \frac{SOC_{trans-actual}}{SOC_{trans-calculated}},$$

wherein $SOC_{trans-calculated}$ denotes a previous theoretical amount of charge transfer between the two batteries, and $SOC_{trans-actual}$ denotes a previous actual amount of transferred charge between the two batteries.

5. The method according to claim 2, wherein determining the average SOCs corresponding respectively to the two batteries according to the SOCs comprises:

acquiring total open-circuit voltages and total numbers of battery cells corresponding respectively to the two batteries;

determining average open-circuit voltages corresponding respectively to the two batteries according to the total open-circuit voltages and the total numbers; and determining an average SOC of the two batteries based on the average open-circuit voltages and the conversion relationship between open-circuit voltages and SOCs.

6. The method according to claim 1, wherein judging whether the charge-receiving battery cell is in the overcharge state according to the amount of transferred charge transfer comprises:

determining, in the charge-receiving battery, a target battery cell having a highest SOC before charge transfer, the charge-receiving battery cell corresponding to the target battery cell; and judging whether the charge-receiving battery cell is in the overcharge state based on the amount of charge transfer, an SOC of the target battery cell, a conversion relationship between open-circuit voltages and SOCs, and a warning voltage value.

7. The method according to claim 6, wherein judging whether the charge-receiving battery cell is in the overcharge state based on the amount of charge transfer, the SOC of the target battery cell, the conversion relationship between open-circuit voltages and SOCs, and the warning voltage value comprises:

determining, in response to $OCV(SOC_{avg}+\Delta SOC_{abn} - k \cdot SOC_{trans}) \leq V_{warning}$ being satisfied, that the charge-receiving battery cell is not in the overcharge state; and determining, in response to $OCV(SOC_{avg}+\Delta SOC_{abn} - k \cdot SOC_{trans}) \leq V_{warning}$ being not satisfied, that the charge-receiving battery cell is in the overcharge state, wherein OCV( ) denotes the conversion relationship between open-circuit voltages and SOCs, $SOC_{avg}$ denotes an average SOC of the charge-receiving battery, $\Delta SOC_{abn}$ denotes a difference between the SOC of the target battery cell and $SOC_{avg}$, k denotes a battery aging factor, $SOC_{trans}$ denotes the amount of charge transfer between the two batteries, charge transfer occurring between the two batteries after charging stops, and $V_{warning}$ denotes the warning voltage value.

8. The method according to claim 1, further comprising, after judging whether the charge-receiving battery cell is in the overcharge state according to the amount of transferred charge:

in response to the charge-receiving battery cell being not in the overcharge state, determining a state difference between a current SOC of the charge-receiving battery cell and the overcharge state;

charging, in response to the state difference being greater than or equal to a preset difference, the battery pack at a first charging rate after the preset charging time; and charging, in response to the state difference being less than the preset difference, the battery pack at a second charging rate after the preset charging time, the second charging rate being less than the first charging rate.

9. An electronic device, comprising:
a bus;
a processor; and
a memory communicating with the processor via the bus, the memory storing program instructions that, when executed by the processor, cause the processor to:

determine, based on a charging parameter, states of charge (SOCs) corresponding respectively to two batteries of a battery pack that are connected in parallel and each include a plurality of battery cells, at elapsing of a preset charging time;

calculate, prior to the elapsing of the preset charging time, according to the SOCs, an amount of charge transfer between the two batteries after stopping charging at the elapsing of the preset charging time;

judge whether a charge-receiving battery cell of a charge-receiving battery is in an overcharge state according to the amount of transferred charge; and in response to the charge-receiving battery cell being in the overcharge state, stop charging the battery pack at the elapsing of the preset charging time.

10. The device according to claim 9, wherein:
the SOC of a battery is a collection of cell SOCs corresponding respectively to battery cells of the battery; and
the program instructions further cause the processor to:

determine, according to the SOCs, a respective average SOC corresponding to each of the two batteries, charge transfer occurring between the two batteries after charging stops;

determine an average charge difference between the two batteries according to the average SOCs; and calculate, based on a conversion relationship between open-circuit voltages and SOCs, the average charge difference, and the average SOC of the charge-receiving battery in the two groups of batteries, the amount of transferred charge transfer between the two batteries after charging is stopped after at the elapsing of the preset charging time.

11. The device according to claim 10, wherein the program instructions further cause the processor to:

calculate the amount of charge transfer between the two batteries after charging is stopped at the elapsing of the preset charging time according to $OCV(SOC_{avg} + k \cdot SOC_{trans}) = OCV(SOC_{avg}+\Delta SOC-SOC_{trans})$;

wherein OCV( ) denotes the conversion relationship between open-circuit voltages and SOCs, $SOC_{avg}$ denotes the average SOC of the charge-receiving battery, $\Delta SOC$ denotes the average charge difference between the two batteries, k denotes a battery aging factor, and $SOC_{trans}$ denotes the amount of charge transfer between the two batteries.

12. The device according to claim 11, wherein the program instructions further cause the processor to, before calculating the amount of charge transfer between the two batteries after charging is stopped at the elapsing of the preset charging time according to $OCV(SOC_{avg}+k \cdot SOC_{trans})=OCV(SOC_{avg}+\Delta SOC-SOC_{trans})$ acquire a theoretical open-circuit voltage and an actual open-circuit voltage of the charge-receiving battery after a previous mutual charging of the two batteries;

judge whether the theoretical open-circuit voltage is equal to the actual open-circuit voltage;

in response to the theoretical open-circuit voltage being equal to the actual open-circuit voltage, use a battery aging factor used during a previous charging process as the battery aging factor; and in response to the theoretical open-circuit voltage being not equal to the actual open-circuit voltage, determine the battery aging factor according to $$OCV(SOC_{avg} + k \cdot SOC_{trans-calculated}) =$$
$$OCV(SOC_{avg} + \Delta SOC - SOC_{trans-actual}) \text{ or}$$
$$k = \frac{SOC_{trans-actual}}{SOC_{trans-calculated}},$$

wherein $SOC_{trans-calculated}$ denotes a previous theoretical amount of charge transfer between the two batteries, and $SOC_{trans-actual}$ denotes a previous actual amount of transferred charge between the two batteries.

13. The device according to claim 10, wherein the program instructions further cause the processor to:
acquire total open-circuit voltages and total numbers of battery cells corresponding respectively to the two batteries;
determine average open-circuit voltages corresponding respectively to the two batteries according to the total open-circuit voltages and the total numbers; and
determine an average SOC of the two batteries based on the average open-circuit voltages and the conversion relationship between open-circuit voltages and SOCs.

14. The device according to claim 9, wherein the program instructions further cause the processor to:
determine, in the charge-receiving battery, a target battery cell having a highest SOC before charge transfer, the charge-receiving battery cell corresponding to the target battery cell; and
judge whether the charge-receiving battery cell is in the overcharge state based on the amount of transferred charge, an SOC of the target battery cell, a conversion relationship between open-circuit voltages and SOCs, and a warning voltage value.

15. The device according to claim 14, wherein the program instructions further cause the processor to:
determine, in response to $OCV(SOC_{avg}+\Delta SOC_{abn}-k \cdot SOC_{trans}) \leq V_{warning}$ being satisfied, that the charge-receiving battery cell is not in the overcharge state; and
determine, in response to $OCV(SOC_{avg}+\Delta SOC_{abn}-k \cdot SOC_{trans}) \leq V_{warning}$ being not satisfied, that the charge-receiving battery cell is in the overcharge state, wherein $OCV(\ )$ denotes the conversion relationship between open-circuit voltages and SOCs, $SOC_{avg}$ denotes an average SOC of the charge-receiving battery, $\Delta SOC_{abn}$ denotes a difference between the SOC of the target battery cell and $SOC_{avg}$, k denotes a battery aging factor, $SOC_{trans}$ denotes the amount of charge transfer between the two batteries, charge transfer occurring between the two batteries after charging stops, and $V_{warning}$ denotes the warning voltage value.

16. The device according to claim 9, wherein the program instructions further cause the processor to, after judging whether the charge-receiving battery cell is in the overcharge state according to the amount of charge transfer:
in response to the charge-receiving battery cell being not in the overcharge state, determine a state difference between a current SOC of the charge-receiving battery cell and the overcharge state;
charge, in response to the state difference being greater than or equal to a preset difference, the battery pack at a first charging rate after the preset charging time; and
charge, in response to the state difference being less than the preset difference, the battery pack at a second charging rate after the preset charging time, the second charging rate being less than the first charging rate.

17. A computer-readable storage medium, storing a program that, when executed by a processor, causes the processor to:
determine, based on a charging parameter, states of charge (SOCs) corresponding respectively to two batteries of a battery pack that are connected in parallel and each include a plurality of battery cells, at elapsing of a preset charging time;
calculate, prior to the elapsing of the preset charging time, according to the SOCs, an amount of charge transfer between the two batteries after stopping charging at the elapsing of the preset charging time;
judge whether a charge-receiving battery cell of a charge-receiving battery is in an overcharge state according to the amount of charge transfer; and
in response to the charge-receiving battery cell being in the overcharge state, stop charging the battery pack at the elapsing of the preset charging time.

18. The storage medium according to claim 17, wherein:
the SOC of a battery is a collection of cell SOCs corresponding respectively to battery cells of the battery; and
the program further causes the processor to:
determine, according to the SOCs, a respective average SOC corresponding to each of the two batteries, charge transfer occurring between the two batteries after charging stops;
determine an average charge difference between the two batteries according to the average SOCs; and
calculate, based on a conversion relationship between open-circuit voltages and SOCs, the average charge difference, and the average SOC of the charge-receiving battery in the two batteries, the amount of charge transfer between the two batteries after charging is stopped at the elapsing of the preset charging time.

19. The storage medium according to claim 18, wherein the program further causes the processor to:
calculate the amount of charge transfer between the two batteries after charging is stopped at the elapsing of the preset charging time according to $OCV(SOC_{avg}+k \cdot SOC_{trans})=OCV(SOC_{avg}+\Delta SOC-SOC_{trans})$;
wherein $OCV(\ )$ denotes the conversion relationship between open-circuit voltages and SOCs, $SOC_{avg}$ denotes the average SOC of the charge-receiving battery, $\Delta SOC$ denotes the average charge difference between the two batteries, k denotes a battery aging factor, and $SOC_{trans}$ denotes the amount of charge transfer between the two batteries.

20. The storage medium according to claim 19, wherein the program further causes the processor to, before calculating the amount of charge transfer between the two batteries after charging is stopped at the elapsing of the preset charging time according to $OCV(SOC_{avg}+k \cdot SOC_{trans})=OCV(SOC_{avg}+\Delta SOC-SOC_{trans})$:

acquire a theoretical open-circuit voltage and an actual open-circuit voltage of the charge-receiving battery after a previous mutual charging of the two batteries;

judge whether the theoretical open-circuit voltage is equal to the actual open-circuit voltage;

in response to the theoretical open-circuit voltage being equal to the actual open-circuit voltage, use a battery aging factor used during a previous charging process as the battery aging factor; and in response to the theoretical open-circuit voltage being not equal to the actual open-circuit voltage, determine the battery aging factor according to $$OCV(SOC_{avg} + k \cdot SOC_{trans-calculated}) =$$
$$OCV(SOC_{avg} + \Delta SOC - SOC_{trans-actual}) \text{ or}$$
$$k = \frac{SOC_{trans-actual}}{SOC_{trans-calculated}},$$

wherein $SOC_{trans-calculated}$ denotes a previous theoretical amount of charge transfer between the two batteries, and $SOC_{trans-actual}$ denotes a previous actual amount of transferred charge between the two batteries.

* * * * *